(12) United States Patent
Li

(10) Patent No.: US 11,706,262 B2
(45) Date of Patent: Jul. 18, 2023

(54) SYSTEM AND METHOD FOR GROUP COMMUNICATION AND INFORMATION SHARING

(71) Applicant: Qiong Li, Blauvelt, NY (US)

(72) Inventor: Qiong Li, Blauvelt, NY (US)

( * ) Notice: Subject to any disclaimer, the term of this patent is extended or adjusted under 35 U.S.C. 154(b) by 0 days.

(21) Appl. No.: 17/724,614

(22) Filed: Apr. 20, 2022

(65) Prior Publication Data

US 2022/0345501 A1    Oct. 27, 2022

Related U.S. Application Data

(60) Provisional application No. 63/179,197, filed on Apr. 24, 2021.

(51) Int. Cl.
| | |
|---|---|
| *H04L 65/1069* | (2022.01) |
| *G06F 3/04817* | (2022.01) |
| *G06F 3/04847* | (2022.01) |
| *G06F 3/0482* | (2013.01) |
| *G06F 3/0488* | (2022.01) |

(52) U.S. Cl.
CPC ........ *H04L 65/1069* (2013.01); *G06F 3/0482* (2013.01); *G06F 3/04817* (2013.01); *G06F 3/04847* (2013.01); *G06F 3/0488* (2013.01)

(58) Field of Classification Search
CPC ............... H04L 65/1069; H04L 65/403; G06F 3/04817; G06F 3/0482; G06F 3/04847; G06F 3/0488
See application file for complete search history.

(56) References Cited

U.S. PATENT DOCUMENTS

| 9,020,476 B2 * | 4/2015 | Leipzig ................... G06F 9/453 455/420 |
| 2007/0274464 A1 | 11/2007 | Cameron et al. |
| 2008/0294490 A1 | 11/2008 | Nuhaan et al. |
| 2009/0298535 A1 | 12/2009 | Klein et al. |
| 2011/0185313 A1 | 7/2011 | Harpaz |
| | (Continued) | |

OTHER PUBLICATIONS

Echo Video and Audio Calling—Sky, Drop-in and Alexa https://www.youtube.com/watch?v=ENUYjOLzK0o (Year: 2020).*

(Continued)

*Primary Examiner* — Cao H Nguyen
(74) *Attorney, Agent, or Firm* — Michael E. Zall

(57) ABSTRACT

A communication system comprises a set of specialized backend servers 100 and groups of terminals (210, 220) connected through the Internet. Users of the communication system can make video calls and share text messages, images and video clips through the terminals (210, 220). The terminals in this system are organized into private terminal groups 200 of varying sizes. Each group has only one controller terminal 210 and one or more display terminals 220. Both types of terminals provide an easy-to-use graphic user interface for the user to access the communication services provided by the system. Communication and information sharing between any display terminals must be pre-authorized by their controllers. This communication system, while ensuring security and privacy, addresses the needs of caregiver groups that include caregiver professionals, family members and care receivers, to facilitate private conference calls, information sharing and caring activity coordination.

21 Claims, 27 Drawing Sheets

(56) References Cited

U.S. PATENT DOCUMENTS

| | | | |
|---|---|---|---|
| 2012/0096503 A1 | 4/2012 | Slothouber et al. | |
| 2013/0086618 A1 | 4/2013 | Klein et al. | |
| 2014/0337752 A1* | 11/2014 | Cammarata | H04M 1/72475 |
| | | | 715/744 |
| 2015/0244855 A1 | 8/2015 | Serra et al. | |
| 2019/0166206 A1* | 5/2019 | Trinh | H04L 41/0806 |
| 2020/0098482 A1 | 3/2020 | Groves et al. | |

OTHER PUBLICATIONS

Best Way to Make Video Calls to Seniors With Alzheimer's or Dementia in Nursing Homes, Daily Caring, May 14, 2021, https://dailycaring.com/best-way-to-make-video-calls-to-seniors.

* cited by examiner

SYSTEM AND METHOD FOR GROUP COMMUNICATION AND INFORMATION SHARING

RELATED APPLICATIONS

This application claims priority of provisional applications 63/179,197 filed on Apr. 24, 2021. The entire disclosure of this application is incorporated herein by reference.

FIELD OF THE INVENTION

This invention relates to an information and communication system, in particular an information and communication system preferably for use by elderly or handicapped individuals, particularly those approaching or in need of assisted living, and their caregivers.

BACKGROUND

Information technology has become pervasively available and penetrating every aspect of our daily lives. We rely on smart phones, tablets and computers to communicate with each other and receive information. With the rapid advance of technology, products that are used for accessing information and communication services are constantly changing. This is an age welcomed by tech savvy and young people who can easily adapt to new product releases or ever-changing technologies. Existing information technologies are driven by the development strategy that focuses on the needs of mainstream populations of the middle age range, who are constantly looking for new products or releases that can bring cool features with sophisticated functions.

However, for the elderly, aged or handicapped that are approaching the stage of life that may require assisted living, hereinafter referred to as "elderly", they are very often left behind by the changing technology. They become more and more disconnected from families and societies when they start to lose the ability to understand and operate the smart devices that are used to access information and receive greetings from family. The elderly become partially or completely isolated and separated from their friends, family and information. As a result they become isolated and their quality of life deteriorates.

Elderly people as they approach a stage requiring assisted living, show the following symptoms and conditions:
  They have a certain degree of memory loss.
  They are challenged to understand the complexity and logic they are faced with due to cognitive impairment.
  They show behavioral symptoms such as wandering.
  They have extensive medical needs.
  They require daily nursing services.

The elderly, faced with the above symptoms and conditions, are challenged to effectively use the currently available smart phones or tablet products. They lack the ability to operate these devices and use them safely. However, they still have the following needs:
  Remain connected with family members or caregivers.
  Read, watch or listen to materials that they can comprehend and nourish their spiritual needs, such as media content related to their past life, religious faith, or culture. For example, the elderly prefers to access personalized content that bring back their memories and/or consistent with their values.
  To be monitored for safety. Some elderly persons, due to their medical conditions, need to be monitored and watched constantly.
  They have a need or desire to reach out for assistance.
  The caregiving responsibilities can be shared between professional caregivers and family members.

In order to assist the elderly with the above, a completely new technology is required that is designed from the ground up focusing on the needs of elderly. The invention described herein and its related technology is specifically designed with the elderly in mind, although other users are contemplated.

Some of the difficulties and issues preventing the elderly from using existing technology, such as smart phones, tablets or computers include:
  The devices contain too many functions that the elderly do not need and will rarely if ever use.
  The elderly are intimated by all of the technology terms and concepts that appear in the user guides.
  The devices require that they be configured to meet the personal needs of the user, but such settings and configurations are too complicated for the elderly to understand or use.
  Navigation UI of apps are complicated and keep changing.
  Software bugs with the devices and their complexity are troublesome and leave the elderly troubled and quickly frustrated.
  The elderly are typically slow to learn and quick to forget.
  It is too much for the elderly to manage the contents and unnecessary contacts that gradually clog their devices.
  The elderly simply cannot constantly maintain the device in good working condition.

For example, the device may become short of memory due to a chatty social network app that the elder is using and all the pictures posted in that app will eventually clog the device; there is a software update that may require the user to react and the elder may have no clue on what to do with it; the elder may keep open web pages in the browser app without knowing that these pages need to be closed from time to time, and it can eventually slow down the device, etc. The elder may simply not know how to adjust the device audio volume, screen brightness, or may have difficulty in finding the information he (or she) wants to view. The elder could forget to plug the device into the charger resulting in a "dead" device, and the family members can't reach him (or her) in time, causing perhaps a momentary panic.

Very often, it takes a group of individuals to provide proper care to elders who are in need of assisted living. For example, an elderly person may need multiple family members to take turns to care for their elders; professional caregivers need directions and instructions from family members when delivering care to their loved ones; and families may want to have a way to be able to verify that the care is properly provided. The group of caregivers who may be responsible for the different aspects of caring the same elder, for example, nurse, doctor, pharmacy and helper, may want to meet with the elders or family members to plan out daily caring activities. Therefore, it calls for a system that can facilitate the communication within the group to provide a coordinated and adequate care for elders.

This invention and the related technology overcome all the above listed difficulties for the elderly while it can still satisfy the elderly's basic needs to access information and communicate. The invention also addresses the need for a group communication system for caregiver groups that can facilitate group conference calls, information sharing and activity coordination.

The following references may be relevant to this invention:

Patent Publication CN201810230871, China, 2018-Multimedia Transmission System and Method for Network Media Information Personalization—This publication discloses a system and method to accomplish multimedia content personalization and transmission.

Patent Publication CN201910617606, China, 2019-Network Service Proxy Server, Server Group, Service Proxy System and Service Proxy Method.—This publication discloses a system and method to assist elderly users to make online service requests for information, ordering and reservation.

U.S. Pat. No. 9,020,476B2 to Leipzig, System and Method for Remote Care and Monitoring Using a Mobile Device, Publication Date: Apr. 28, 2015. This publication discloses a system and method to create a simplified user interface that serves as a wrapper around regular smartphone functions to make it easier for elders to use. The method also binds two smartphones together to allow one phone to monitor the other phone's calling status and operation status.

US2020/0098482A1 to Groves et al. Title: Interactive Device for Displaying Personalized Content for Aiding in the Care of Assisted Living, Publication Date: Mar. 26, 2020. This publication discloses a system and method that can be realized as a "digital picture frame" that receives and displays information such as calendar events, address book and reminder messages sent from caregivers to the elderly users. It allows the information on the device to be remotely managed and updated.

US2015/0244855A1 to Serra et al Title: Providing Assistance to Special Needs Users, Publication Date: Aug. 27, 2015, This publication discloses customizing a mobile device to fit the needs of elderly users or caregivers by allowing only certain functions or features of the mobile device to be accessible to the elderly users therefore avoiding unnecessary confusion.

US2014/0337752A1 to Cammaratal Title: Handling and Configuration of a Mobile Communications Terminal, Publication Date: Nov. 13, 2014. This publication discloses a method of configuring a mobile device through its controller to access only a subset of applications therein to simplify the use of the device.

US2011/0185313A1 to Harpaz Title: Method and System for Customizing A User-Interface Of An End-User Device, Publication Date: Jul. 28, 2011. This publication discloses a method of configuring a mobile device to display a simplified user interface and a subset of applications that are relevant to the specific user of the mobile device.

US2008/0294490A1 to Nuhaan Title: Networking Platform for Facilitating Interactions and Sharing of Caretaking Responsibilities Between Family Members, Publication Date: Nov. 27, 2008. This publication discloses a method of managing collections of calendar events or messages for a care receiver that are submitted by the caregivers of the care receiver.

US2007/0274464A1 to Cameron Title: Multichannel Content Personalization System and Method, Publication Date: Nov. 29, 2007. A system and method of making automatic phone calls to a senior with customized pre-recorded audio programs and for collecting call recipient responses that may be analyzed later by caregivers.

Best Way To Make Video Calls To Seniors With Alzheimer's Or Dementia In Nursing Homes by Cottam Publication Date: May 14, 2021 (https://dailycaring.com/best-way-to-make-video-calls-to-seniors-with-alzheiners-or-dementia-in-nusin-homes-durinig-coronavirus). This publication discloses a product called ViewClix Smart Frame that can display stored pictures, sticky notes, and receiving one-directional drop-in video call from a portal app to the frame. The publication describes the Amazon Echo Show device. The Echo Show is an Alexa personal assistant with a video screen. Amazon's Echo product uses VOIP technology to connect the devices and allow drop-in calls between them.

SUMMARY OF THE INVENTION

This invention is directed to a system and method that facilitates effective communications between the elders and their caregivers and family members or among the caregivers. This novel method focuses on video conferencing and information sharing. It is intended to be a dedicated technology for group communication. The advantage of this method is its simplicity of operation that meets all the needs and constraints when elderly users are involved.

This invention is directed to a system and method for achieving group communication. The system enables human users to communicate through specialized terminal devices that connect to each other through the Internet with the assistance of a group of dedicated backend servers running in data centers that reside in a public or a private cloud with, each server performing a separate set of functions for the system. In this invention, the terminal devices, are based on the needs the users (elders) and caregivers and are self-assembled into separate private groups. For convenience herein, we refer to such a private group as a T-Group, e.g., a terminal group. Each T-Group has at least two terminal devices, wherein one terminal device acts as the controller of the group (referred to herein as the C-Terminal), and the rest of the terminal devices in the group act as the display terminals (referred to herein as the D-Terminals). The size of such a group varies, for example, between 2 to 18 terminals or individuals. It should be noted that the limitation of 18 is an arbitrary number selected for use herein. There is no hard limit on the group size. The C-Terminal and D-Terminal functionalities are both implemented using the same type of tablet computer with a touch screen running a mobile OS, such as Android OS.

All C-Terminal and the D-Terminals in a T-Group are connected to each other through the Internet forming a mesh network of tablets. The connections among the tablets are assisted by the set of dedicated backend servers, each of which performs a separate set of functions for the group communication system. The servers run in data centers that reside in public or private clouds.

The set of servers jointly accomplish the following functions for the system:

1. Grouping the terminals into segregated private T-Groups, each has one C-Terminal and at least one D-Terminal.
2. Facilitating the connections among D-Terminals that are authorized by their associated C-Terminals to allow such connection to happen.
3. Facilitating the auto-play process of a D-Terminal that is driven by a playlist.
4. Relaying information posted to the D-Terminals
5. Relaying video calls among terminals
6. Relaying control commands and setting changes from C-Terminal to D-Terminal
7. Relaying D-terminal's real-time operation status to its controller C-Terminal 8. Facilitating a C-Terminal to trace and control the auto-play process of the connected D-Terminal
9. Authenticating and authorizing all connections among the terminals in the system.

Within the group communication system, every terminal is individually addressable through its terminal ID, which is a string value unique for every terminal in the system.

Communications between terminals are allowed typically only among the terminals within the same group. Within the same group, the C-Terminal (the controller) can connect to any of the D-Terminals (display terminals) by default. However, the connectivity between any of the two D-Terminals, even though they belong to be the same T-Group and under the control by the same C-Terminal, still requires pre-authorization by the controller. Cross-group communication between two D-Terminals that belong to two different T-Groups can be allowed with the simultaneous authorizations by both the C-Terminals of the two involved T-Groups.

This grouping mechanism ensures high security and privacy for the users of this group communication system and allows the formations of T-Groups quickly adapt to user teaming changes.

The D-Terminal in the system mainly provides the following functions to its users:
1. Receives drop-in video calls.
2. Allows users to place video calls to authorized terminals. A D-Terminal can always place a video call to its C-Terminal (the controller). A D-Terminal rejects unauthorized incoming calls.
3. Allow users to place conference calls that are joined by more than two terminals.
4. Allows users to freely turn on or off camera, microphone and speakers anytime during video call.
5. Automatically follow a playlist to play back the text, picture and video messages that are posted to the terminals. The playlist is maintained by the content server of the system described later in the disclosure.
6. Allows users to navigate the post using the navigation buttons located at the bottom of the terminal screen.
7. Provides a set of advanced functions that can be accessed through the popup menu, which pops up when the screen is touched.
8. Through the popup menu, advance users can post text, picture and video messages from one D-Terminal to another with the pre-authorization by the C-Terminal. Users can also post the messages from a D-Terminal to its associated C-Terminal.
9. Both D-Terminal and C-Terminal show a message notifier view at the bottom right corner of the screen when new posts arrive.
10. Through the popup menu, advanced users can forward or delete posts of the D-Terminal.
11. Through the popup menu, advanced users can temporarily block video call, mute volume, pause auto play.
12. Through the popup menu, advanced users can change settings of the device, which include:
   a. WiFi Setup
   b. Screen brightness
   c. Disable or enable incoming call
   d. Videocam on or off
   e. Set the auto playback speed
   f. Set to a nighttime setting during which the device screen goes black.

The C-Terminal (i.e., controller) of a T-Group, can be paired with any one of the D-Terminals in the group at any time. Once the two are paired, the C-Terminal has full access over the paired D-Terminal through the Internet. The C-Terminal monitors and tracks the operation status of the D-Terminals remotely. It can change the D-Terminal settings remotely. It can trace the operation status and synchronize the playback process of the paired D-Terminal over the Internet. It can control the D-Terminal operation remotely. With the C-Terminal (the controller) can remotely assist the use of the D-Terminal to accomplishe hand-free operation of the D-Terminal for the elderly user.

Through the C-Terminal, the user can know the following status of the paired D-Terminal:
1. Its connectivity with Internet
2. Battery level and whether the terminal is plugged to charger
3. Screen brightness
4. Screen is on or off
5. Sound volume
6. Auto-playback status such as what type of posts that the D-Terminal is playing Through the C-Terminal, the user can change the following settings of the paired D-Terminal:
1. Auto playback speed
2. Enable/disable the popup menu on the terminal
3. Enable/disable incoming call
4. Videocam is on or off
5. Message expiration dates
6. Authorized email addresses that can post to the terminal
7. Authorized D-Terminals that can post and make video calls to this terminal
8. Terminal display name
9. Screen protection pin settings
10. Nighttime settings.

Through the C-Terminal, the user can perform the following remote controls on the paired D-Terminal:
1. Increase or decrease the screen brightness
2. Turn on or off the screen
3. Increase or decrease the sound volume
4. Pause, restart or change the order of the auto-playback process
5. Ping the D-Terminal
6. Reconnect the D-Terminal with TF Channel
7. Display the exact posts in sync with the paired D-Terminal.

This system and method innovatively uses playlists to accomplish content personalization and content management. The auto playback process of each D-Terminal is driven by the terminal's playback list that is maintained by the system. The system adds new entries to the playlist for a terminal when there are new posts that are addressed to the D-Terminal. The D-Terminal constantly synchronizes with the servers for its playlist. Once it detects changes of its playlist, it will move on to download the new posts from the content server, and add the new posts to its auto playback process.

The D-Terminal doesn't need to permanently store or manage its posts locally. Upon connection with the system, it will always synchronize with the system for playlists first, and it moves on to request for a post only if it doesn't have the post in its local cache. When a post is expired, it will be removed from both the playlist and the local cache. This design avoids the user's burden and difficulties to perform content management to save storage space on the terminal device.

This invention is directed to a dedicated information and communication system for private groups that is specifically designed for the elderly to allow them and their family members or their caregivers to remain constantly connected and share information.

BRIEF DESCRIPTION OF THE DRAWINGS

Further aspects, features and advantages of the present invention will become more apparent with reference to the following detailed description and the accompanying drawings. Embodiments of the present invention are illustrated in the accompanying drawings as examples and are not to be limited by the figures of the drawings. The drawings are not presented to scale but are used to illustrate the principles of the invention. In the drawings, like reference numbers and terms indicate like elements.

DETAILED DESCRIPTION OF THE INVENTION

The disclosed embodiments that are illustrated by the set of figures listed in the previous section are provided as way of example to fully convey the scope of the invention to those skilled in the art. This invention may, however, be embodied in many different forms and should not be construed as limited to the embodiments illustrated with the accompanying drawings.

Figure 1:
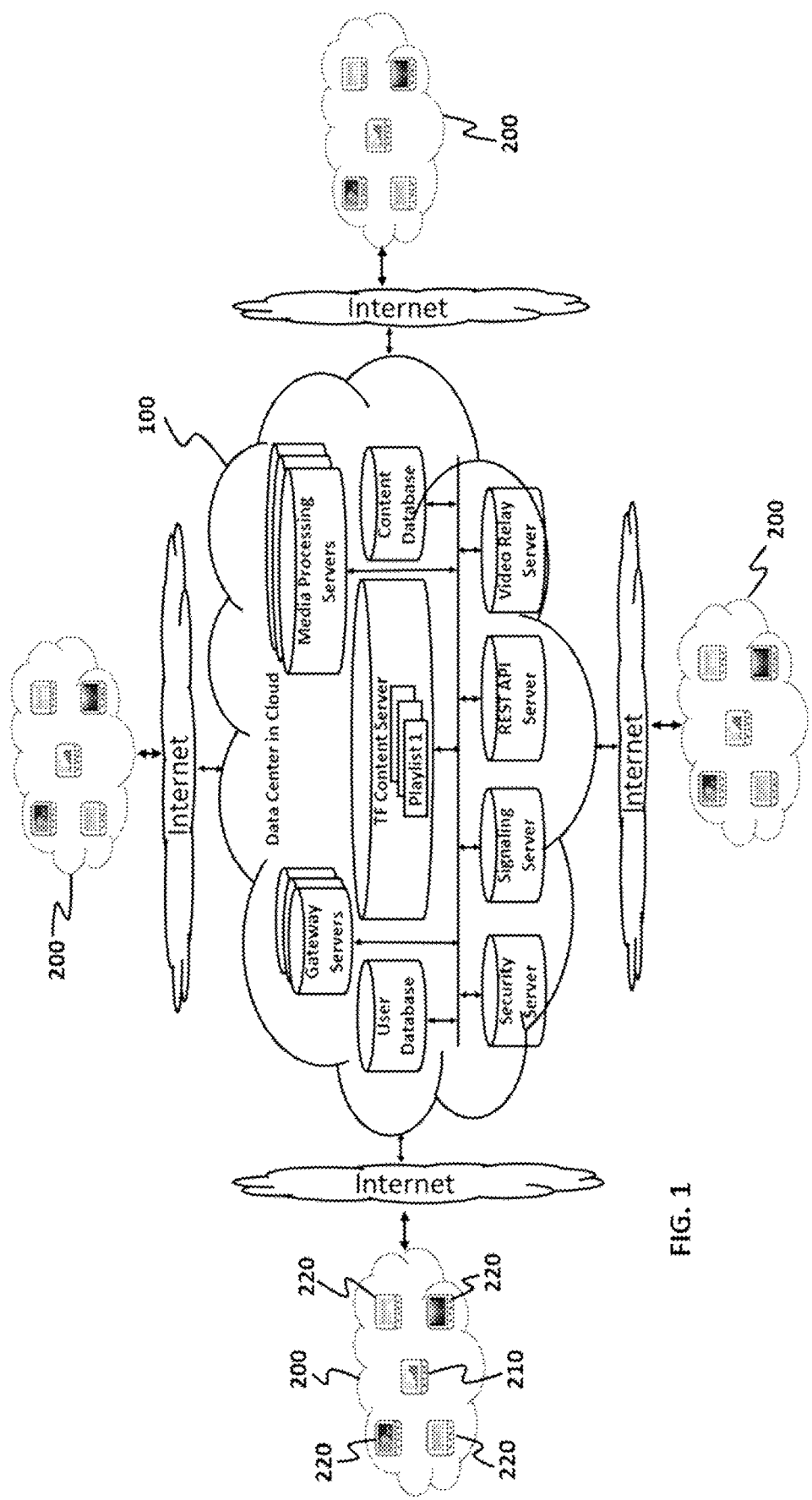
FIG. 1 shows the architecture of one embodiment of the disclosed group communication system and method, in which the communication terminals of type C-Terminal and D-Terminal are grouped into four independent T-Groups that are connected to the servers through the Internet. The number of four T-Groups that are chosen to show in this figure is only for the illustration purpose, not suggesting any limitation to the number of T-Groups that can be supported by the disclosed system.

FIG. 1 shows the architecture view of the group communication system. In this architecture view, four T-Groups, 200, as an example, are connected to the group of backend servers 100 through the Internet. The group of backend servers, each performing a set of specific functions that are described in detail in the following paragraphs, are software systems that can run on one or more physical computers or on one or more virtual machines that may be provisioned by a data center that resides in a public or private cloud. This group of servers running on their host machines, are also connected through the Internet protocol. The communication terminals shown in this architecture are implemented as software application running on mobile devices, such as tablets, that are powered by mobile OS such as Android or iOS. The terminals are organized and isolated into private groups, e.g. T-Groups. Each T-Group is formed with one controller terminal 210, e.g., a type of C-Terminal, and one or more display terminals 220, e.g. a type of D-Terminals. All the D-Terminals in each group can communicate to each other with the preauthorization by the group's C-Terminal. A D-Terminal can always communicate with its controller and vice versa. The system identifies each terminal with an ID string and stores the terminal configuration data in the User Database maintained by the server group. The grouping of terminals in the system is accomplished through the group membership information that is part of the C-Terminal's configuration data. The group membership lists all the D-Terminal IDs that are controlled by the C-Terminal for the T-Group.

Figure 2:
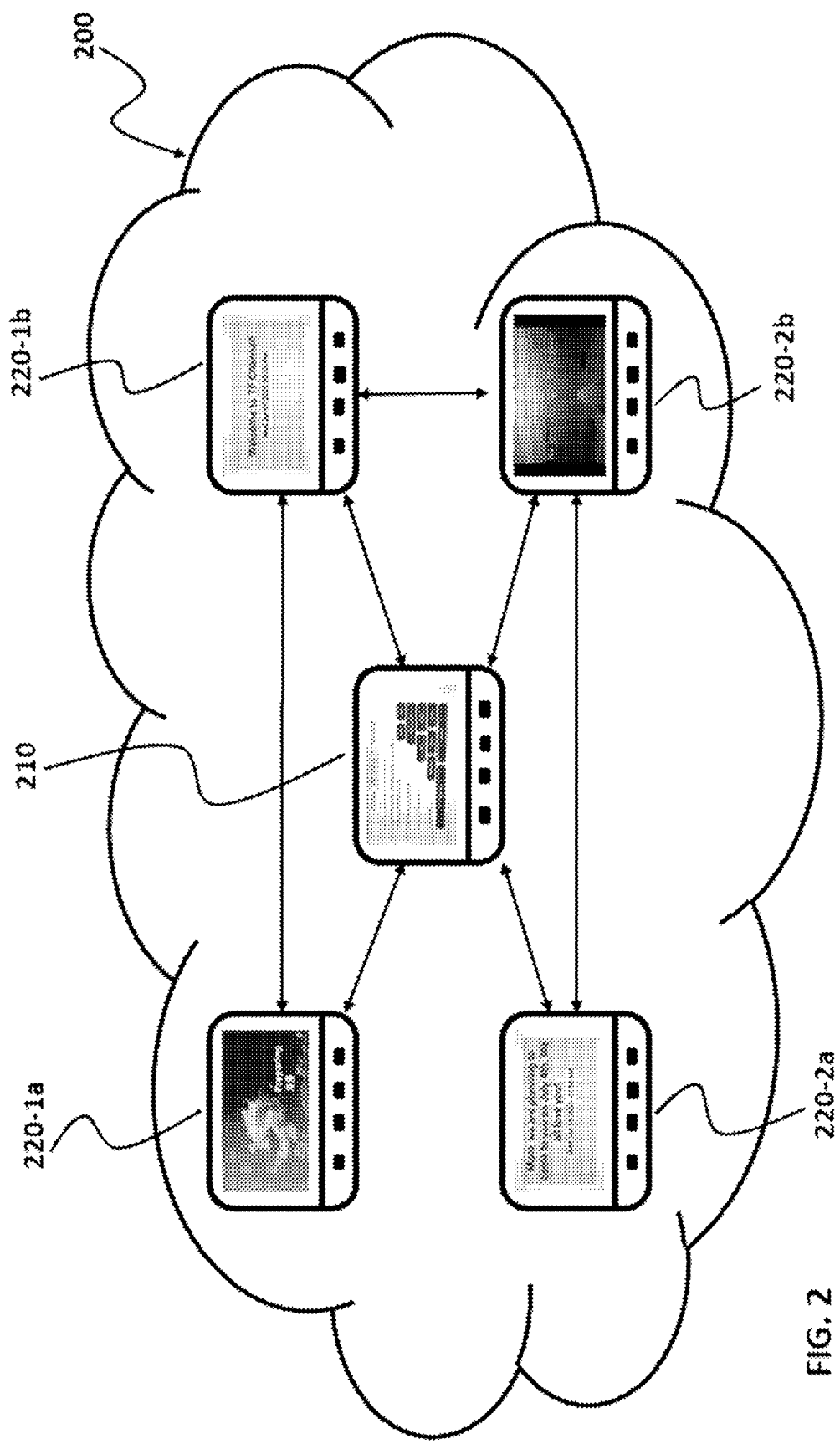
FIG. 2 shows a T-Group that is formed with one C-Terminal and four D-Terminals, which are further isolated into two sub-groups.

FIG. 2 shows an example of T-Group 200 with one C-Terminal 210 and four D-Terminals 220-1a, 220-1b, 220-2a and 220-2b. Every T-Group in the disclosed embodiment consists of only one C-Terminal and at least one D-Terminal. All the D-Terminals in a T-Group are under the full control of the C-Terminal of the group. A D-Terminal can only be associated with one C-Terminal therefore a D-Terminal can only belong to one T-Group at any given time. Any communication between D-Terminals requires the preauthorization of their C-Terminal. In the example of FIG. 2, The T-Group is further divided into three subgroups: subgroup I includes terminal 220-1a, 220-1b and 210; subgroup II includes 220-2a, 220-2b and 210; subgroup III includes 220-1b, 220-2b, 210. The formation of the subgroups in a T-Group is flexible, can be dynamically reconfigured on-demand through the C-Terminal. Crossing T-Group communication is allowed in the embodiment. However, since a C-Terminal can only have control on the D-Terminals of its T-Group, crossing T-Group communication requires all the C-Terminals of the involved G-Groups to perform preauthorization together. This process of authorization will become clear in the later description on the operations of C-Terminal.

Figure 3:
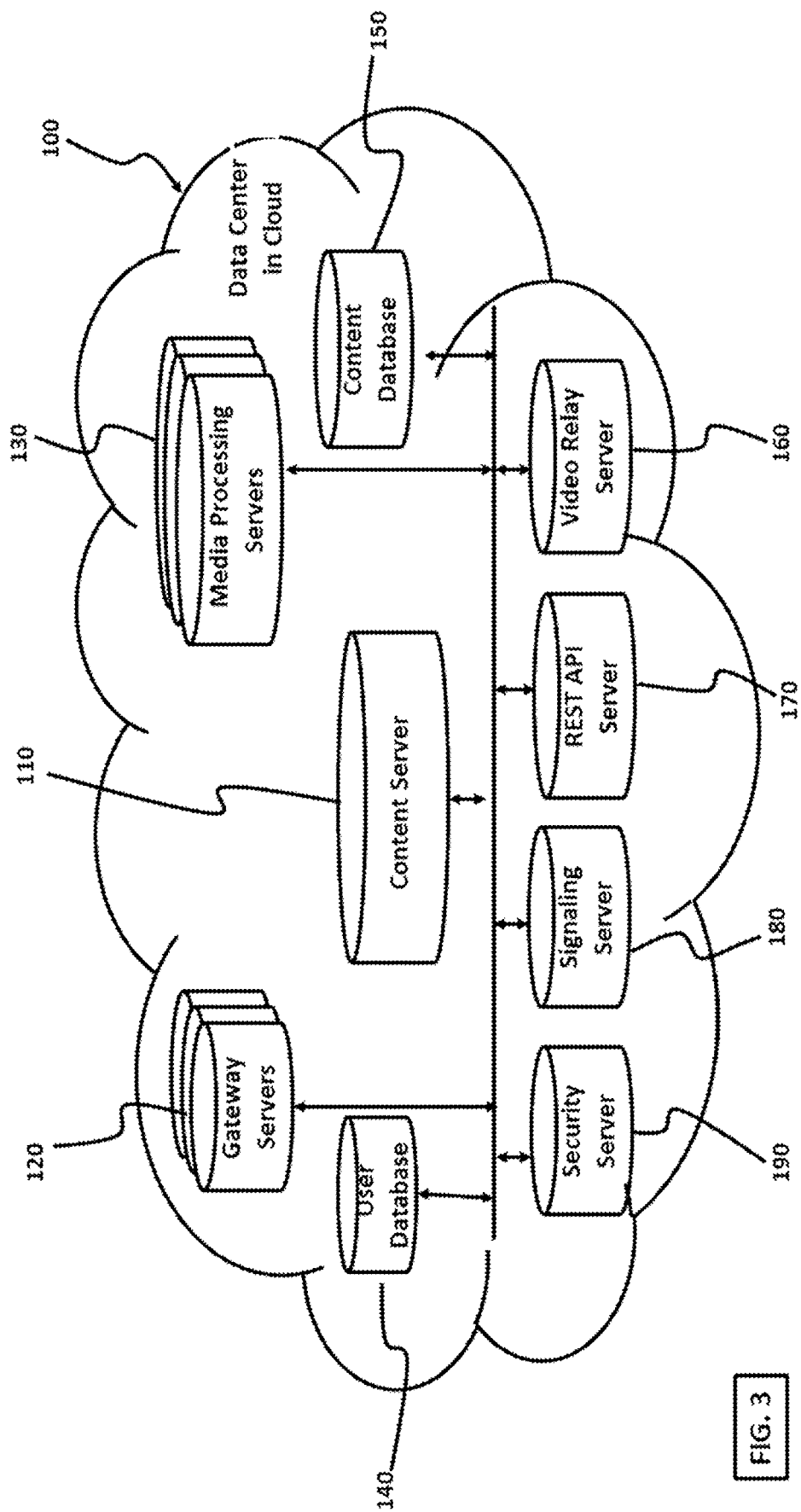
FIG. 3 shows the set of backend servers that perform the required backend functions required for the disclosed system and method.

FIG. 3 shows the set of servers 100 in the disclosed embodiment. The set of servers 100 work coherently together to provide the required functions for the disclosed system and method and include: Content Server 110, Gateway Servers 120, Media Processing Servers 130, User Database 140, Content Database 150, Video Relay Server 160, REST API Server 170, Signaling Server 180 and Security Server 190. In this embodiment, User Database 140 is used to store communication terminal configuration information. Content Database 150 stores users' content of the type text, image and video that are to be displayed or played on the terminal screens. Content Server 110 performs all the tasks involved with content storing, delivering, creating and deleting. Gateway Servers 120 allows users to post information from software applications that are not part of the disclosed system and method, for example, users can post a text message using email to a terminal within the system with the assistance of the email Gateway Server—one type of the Gateway Servers 120, which will be further described later. Media Processing Servers are responsible for converting or formatting the information that are received from external applications, such as an email message, into a proper format that can be displayed or played on the terminal screen. Security Server 190 manages the licenses for terminals. All terminals require to have proper license to connect to the servers. Signaling Server 180 bridges terminals for exchanging control commands, status reports and video call setup. REST API Server 170 serves the http requests made by terminals for playlists or content downloads. Video Relay Server 160 creates tunnels for video streaming over the Internet. The set of servers can be deployed in the data center of either public or private cloud. A public cloud deployment of the system can serve terminals that have access to the general Internet. A private cloud deployment may serve enterprise terminals that have access to the private enterprise network. The servers can also be deployed on a physical computer, which can server terminals of a small organization that prefer to have their own private solution for the requirements, for example, of complete group isolation and communication security. The functions of the set of servers will be further described in the following figures.

Figure 4:
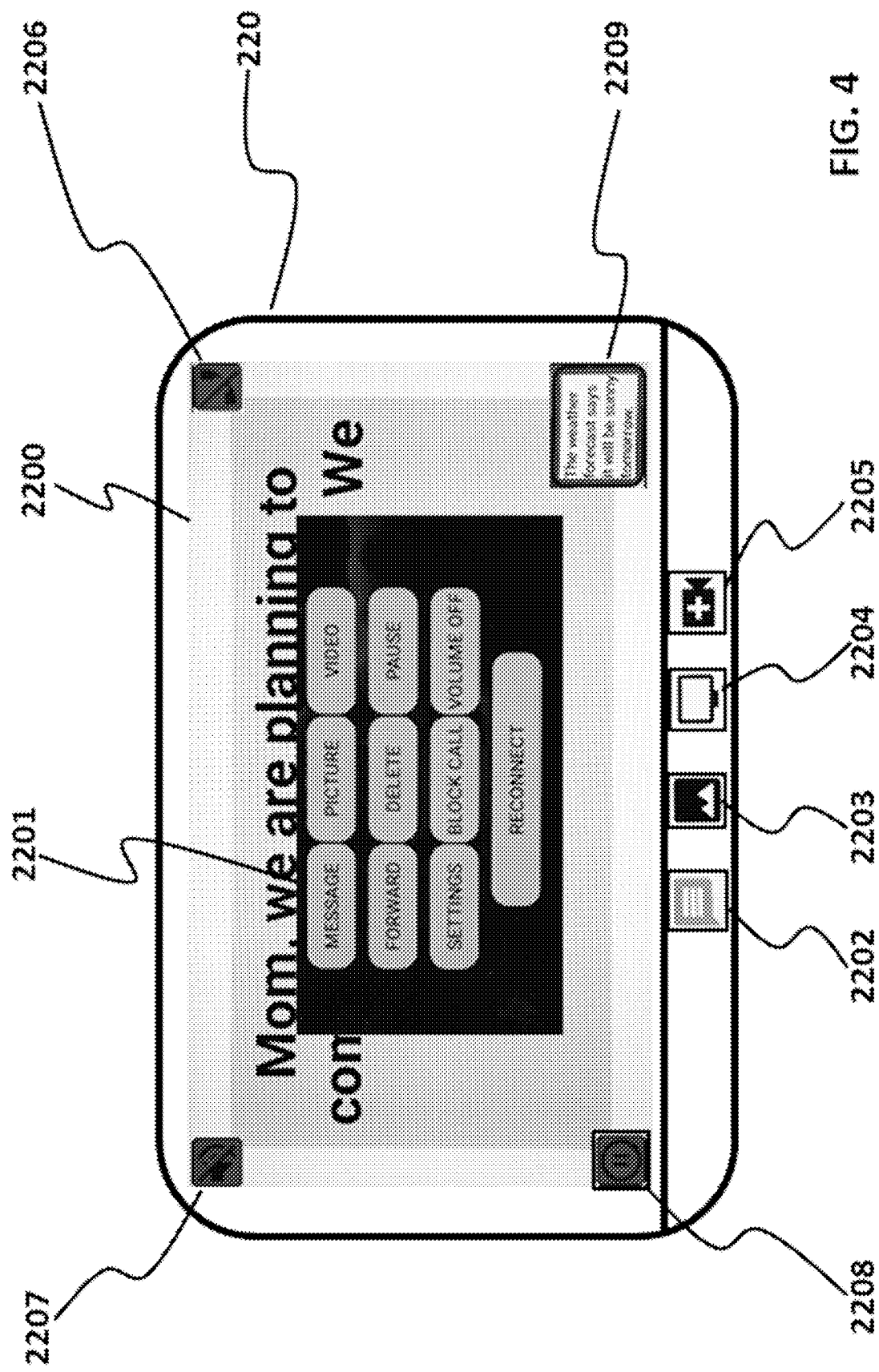
FIG. 4 shows the functional components on the screen of a D-Terminal according to one embodiment of the disclosed system and method.

FIG. 4 shows the functional components on the screen of a D-Terminal 220 in the disclosed embodiment. All the components are clickable icons or views created by software that lead to the access to the D-Terminal functions when being clicked. The set of icons and views comprises Content View 2200, Popup Menu 2201, View Text 2202, View Image 2203, Play Video 2204, Make Call 2205, Blocking Call 2206, Sound Muted 2207, Auto Play Paused 2208, New Post Notifier 2209. Content View 2200 is the screen area where the posted content of the type of either text, or image or video, to this terminal will be displayed or played back automatically and constantly in a round-robin fashion. This feature is designed especially for the needs of elderly user of the D-Terminal, who may have lost the ability to press any of the content navigation icons, e.g., 2202, 2203 and 2204 to select the content to read or watch. The automatic playback is driven by the terminal's playlist that is maintained by the system for the terminal in the Content Database 150 of FIG. 3, which will be further described later. The Popup Menu 2201 provides access to a set of advanced features of the D-Terminal which will be described in FIG. 5. The three status icons: Blocking Call 2206, Sound Muted 2207 and Auto Play Paused 2208 are displayed at the corners of the display view to indicate the operation status of the terminal. Blocking Call 2206 indicates the terminal is set to block incoming call at this moment. Clicking the icon will remove the status icon from the top-right corner and recover the terminal to start receiving incoming call. Sound Muted 2207 indicates that the sound is muted for play video. Clicking the icon will remove the icon from the top-left corner and unmute the sound, Auto Play Paused 2208 indicates the screen is paused and the automatic content playback is stopped. The screen can pause at a text message, an image, or the middle of a video. Clicking the icon will remove the status icon from the bottom-left corner of the display view and restart the automatic playback process. New Post Notifier 2209 is an alerting view that appears at the bottom-right corner of the display view when new posts are received. Clicking on the notifier view will remove the view from the corner, and bring up the new post browser view, which will be described later. View Text 2002, View Image 2203 and Play Video 2204 are the three icons that allow the user to manually navigate the received posts on the D-Terminal. The three icons are always displayed at the bottom of the screen. Clicking any of the icons will interrupt the auto playback process and switch the auto playback to the selected post type immediately. Repeatedly clicking on the same navigation icon will step through all the received posts of that type on the screen. When you stop clicking on the navigation icons, auto playback starts automatically. Clicking on Make Call 2205 starts a drop-in call. The calling process will be further described in the later figures. All calls made through the terminals are drop-in, e.g., the receiving terminal doesn't need to click on any accepting icon or button on its screen to answer the call. All calls are automatically connected by the system and go through. All calls by default are video calls. The video-cam can be turned off for the terminal through terminal settings view, which essentially turns the call to be audio only. The terminal settings view is further described later.

Figure 5:
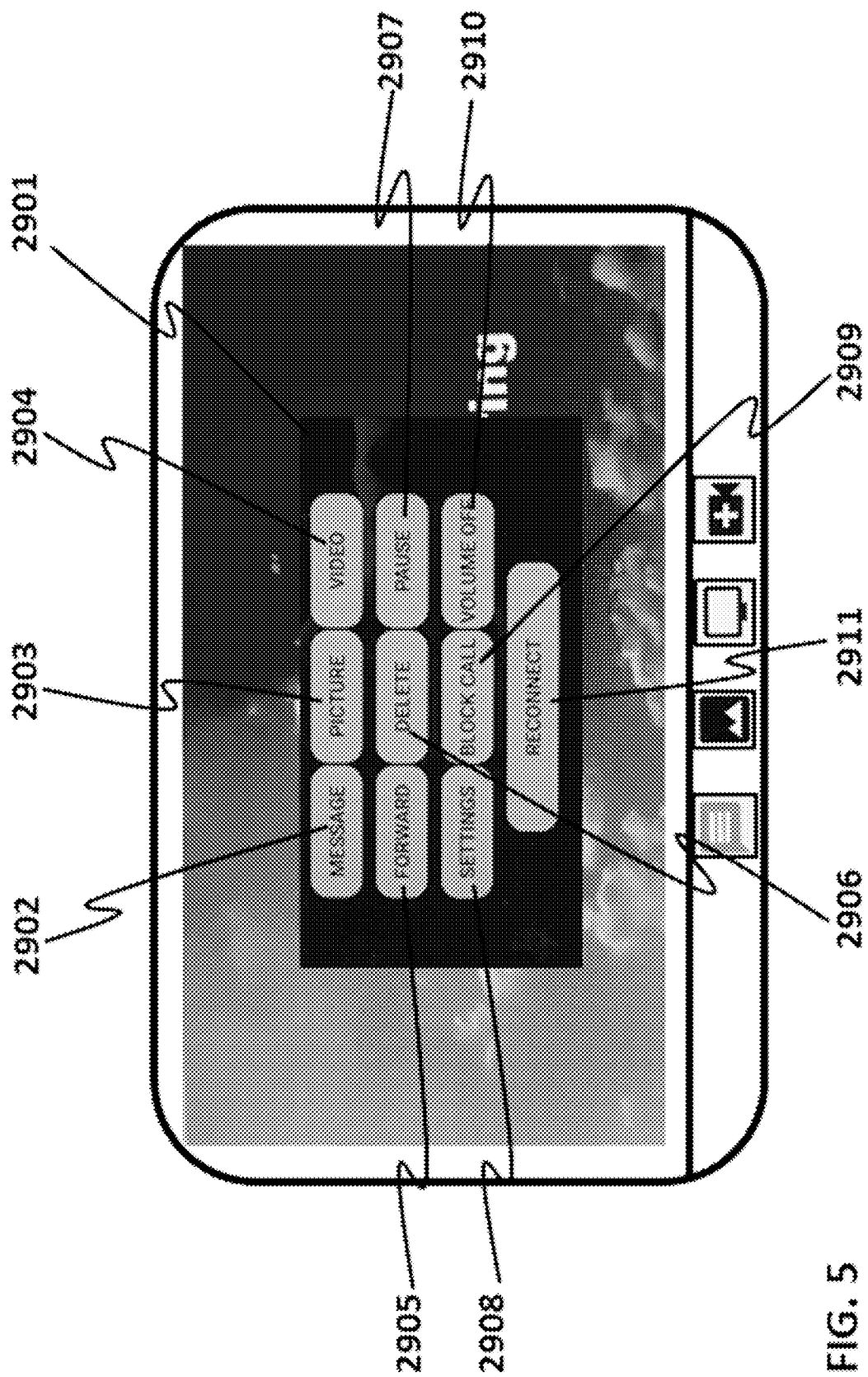
FIG. 5 shows the popup menu of the D-Terminal according to one embodiment of the disclosed system and method.

FIG. 5 shows the popup menu 2901 of the D-Terminal which provides access to the advanced features of the terminal. The set of advanced features accessible through the popup menu comprises: MESSAGE 2902, PICTURE 2903, VIDEO 2904, FORWARD 2905, DELETE 2906, PAUSE 2907, SETTINGS 2908, BLOCK CALL 2909, VOLUME OFF 2910 and RECONNECT 2911. The popup menu 2901 is a way to isolate basic operations of the terminal, such as navigating content and making video calls, from features that require the understanding of technical concepts about information management and device operation, an understanding which can be and often is difficult for elderly users. The set of features that can be made accessible to advanced users through the popup menu 2901 are customizable, and not limited to the list of features that are illustrated in this embodiment. The popup menu 2901 is hidden from the screen when the D-Terminal is in auto playback mode, which is the typical mode when the terminal is not participating in a video call. The user can bring up the popup menu 2901 by simply single tapping the touch screen. In this embodiment, there are 10 action buttons with different labels being displayed on the popup menu. MESSAGE 2901 button allows user to post a text message to another terminal. The detailed steps are disclosed in FIG. 6. The PICTURE 2903 button brings up the terminal camera and allows the user to take a picture and post the picture to another terminal. The VIDEO 2904 button also brings up the terminal camera and allows the user to record a short video and post the video to another terminal. The steps for posting PICTURE and VIDEO are like the steps disclosed in FIG. 6. The FORWARD 2905 button allows the user to forward a selected post to be forwarded to another terminal. The detailed steps are disclosed in FIG. 7. The DELETE 2906 button allows the user to remove a selected post from the playlist and delete the content from its local cache. The detailed steps are disclosed in FIG. 8. The PAUSE 2907 button allows the user to pause the auto play process and freeze the screen at a selected post. The SETTINGS button allows the user to make changes to the device settings. The set of settings that can be changed this way are disclosed in FIG. 15. The BLOCK CALL 2909 button allows the user to block an incoming call temporarily. The detailed steps for blocking an incoming call are disclosed in FIG. 14. The VOLUME OFF 2910 button allows the user to mute the sound of a playing video and display the SOUND MUTED 2207 status icon at the top-left corner of the screen. The RECONNECT 2911 button causes the terminal to restart and refresh the connections with the servers 100. After the popup menu is displayed on the screen, tapping any location of the screen, other than the menu buttons makes the popup menu disappear from the screen. Thus, by tapping the screen repeatedly the popup menu appears and disappears. If no action is taken by the user on any of the buttons of the popup menu, the popup menu will automatically disappear by itself after a predetermined period of time. The this predetermined period of time or delay time of the popup menu can be set through the SETTINGS 2908 button as disclosed in FIG. 15.

Figure 6:
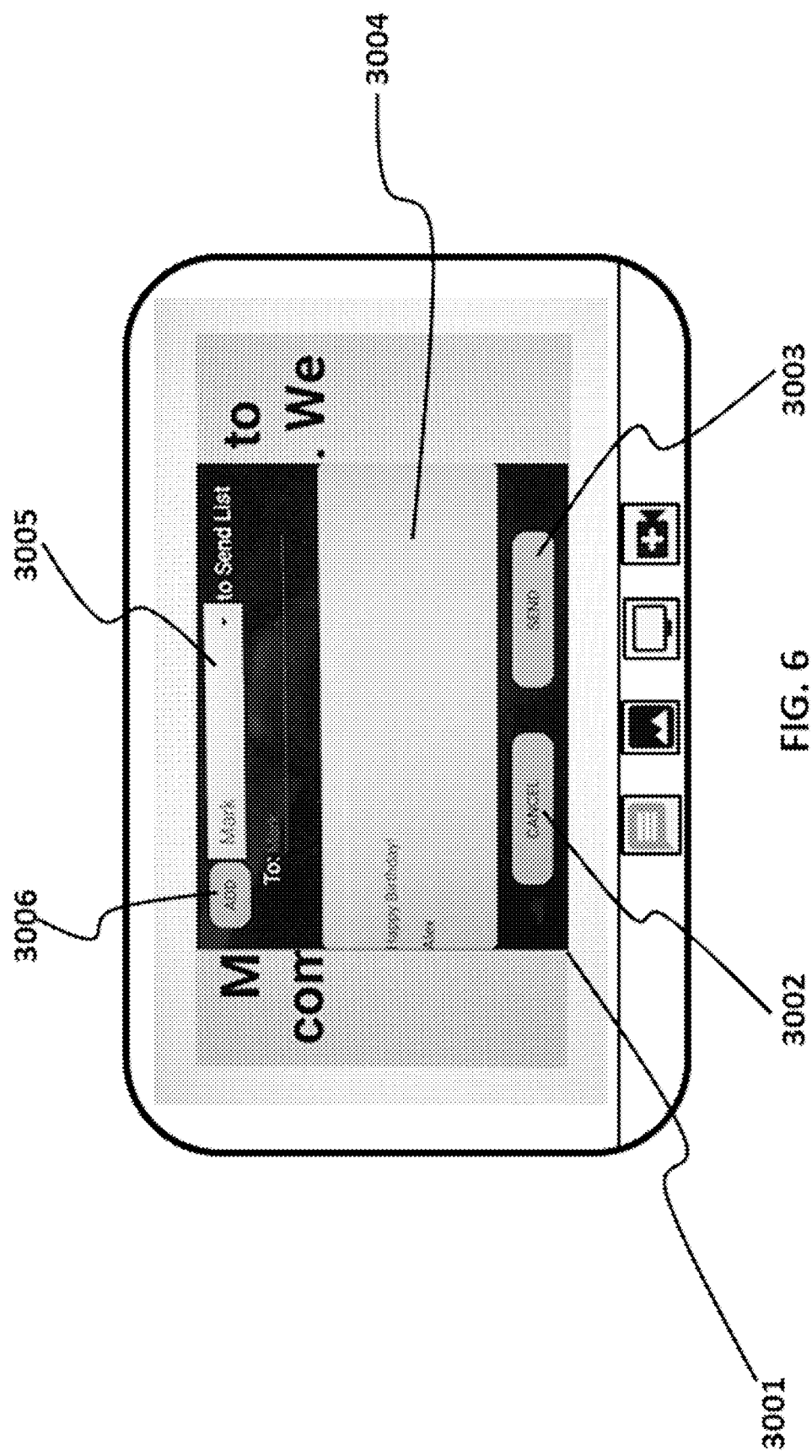
FIG. 6 shows a schematic view of the function of posting message from one terminal to another according to one embodiment of the disclosed system and method.

FIG. 6 shows the message posting view 3001 from which user can post a text message from one terminal to another. The steps for posting a message: (1) user enters the message from the editing area 3004; (2) from the drop-down menu, select the terminal to which the message will be posted; (3) click the ADD 3006 button to add the terminal name to the "To" line. Multiple terminals can be selected and added to the line; (4) click on the SEND 3003 button to post the message or CANCEL to abandon the operation. The image and video posting views are like the message posting view. The difference is that the editing area of the message posting view 3001 is replaced with an image view or a video view respectively for the image posting view and video posting view. When a new post is received at the targeted terminal, the message will first be displayed in the new post notifier 2209 view that appears at the bottom-right corner of the screen as shown in FIG. 4.

Figure 7:
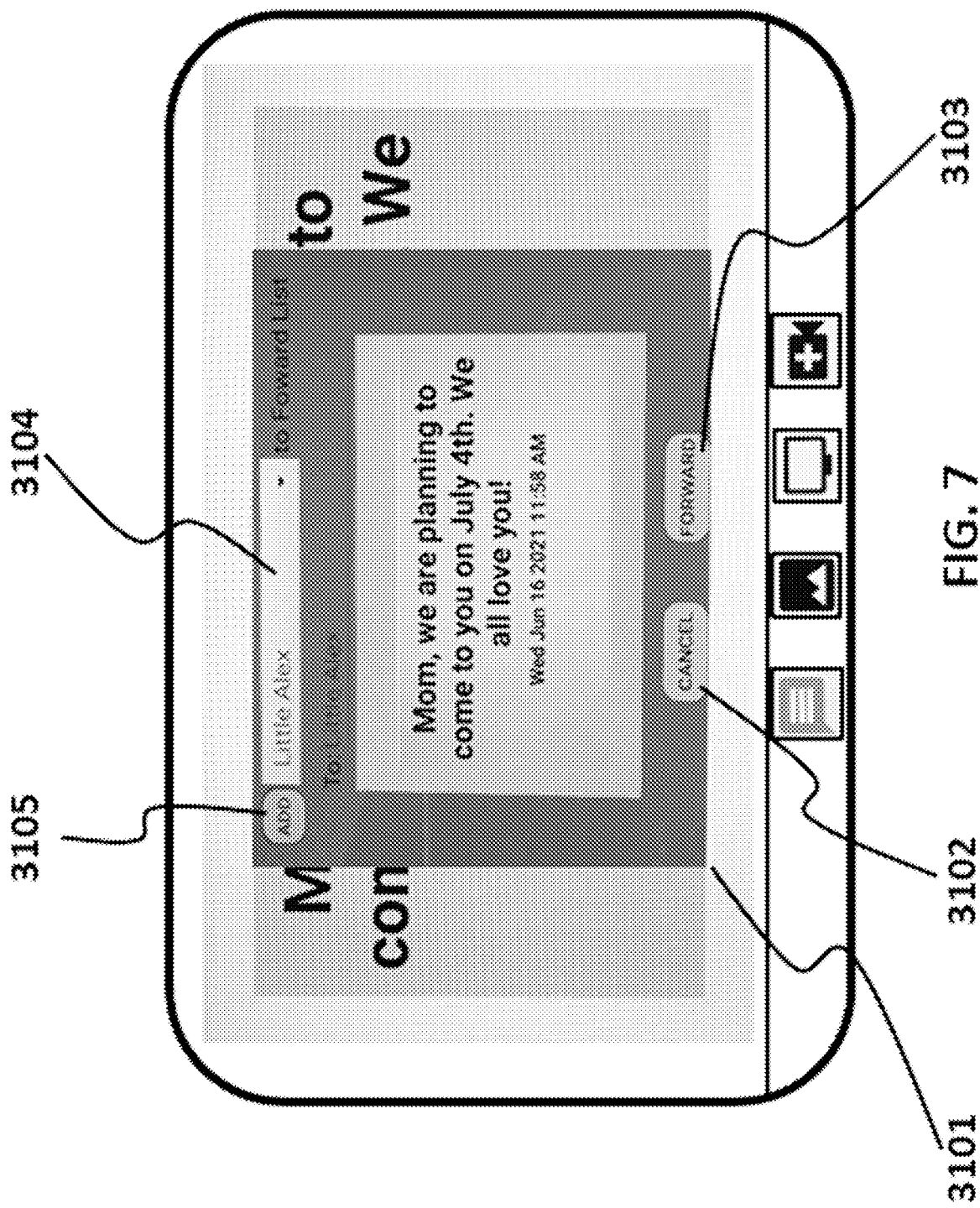
FIG. 7 shows a schematic view of the function of forwarding a message from a D-Terminal to another terminal, which can be either C-Terminal or D-Terminal, according to one embodiment of the disclosed system and method.

FIG. 7 shows the message forwarding view 3101 from which the user can forward a selected post from the D-Terminal to another terminal. The steps for forwarding a post: (1) using the three content navigation buttons located at the bottom of the screen to navigate to the to-be-forwarded post, while the post is still displaying or playing on the screen, tap the screen to bring up the popup menu; (2) click on the FORWARD 2905 button of the popup menu in FIG. 5 to bring up the message forwarding view 3101 with the to-be-forwarded post selected in the view; (3) from the drop-down menu 3104, select the terminal to which the post will be forwarded; (4) click on the ADD 3105 button to add the terminal name to the "To" line. Multiple terminals can be selected and added to the line; (5) click on the FORWARD 3103 button to forward the post or the CANCEL 3102 button to abandon the operation.

Figure 8:
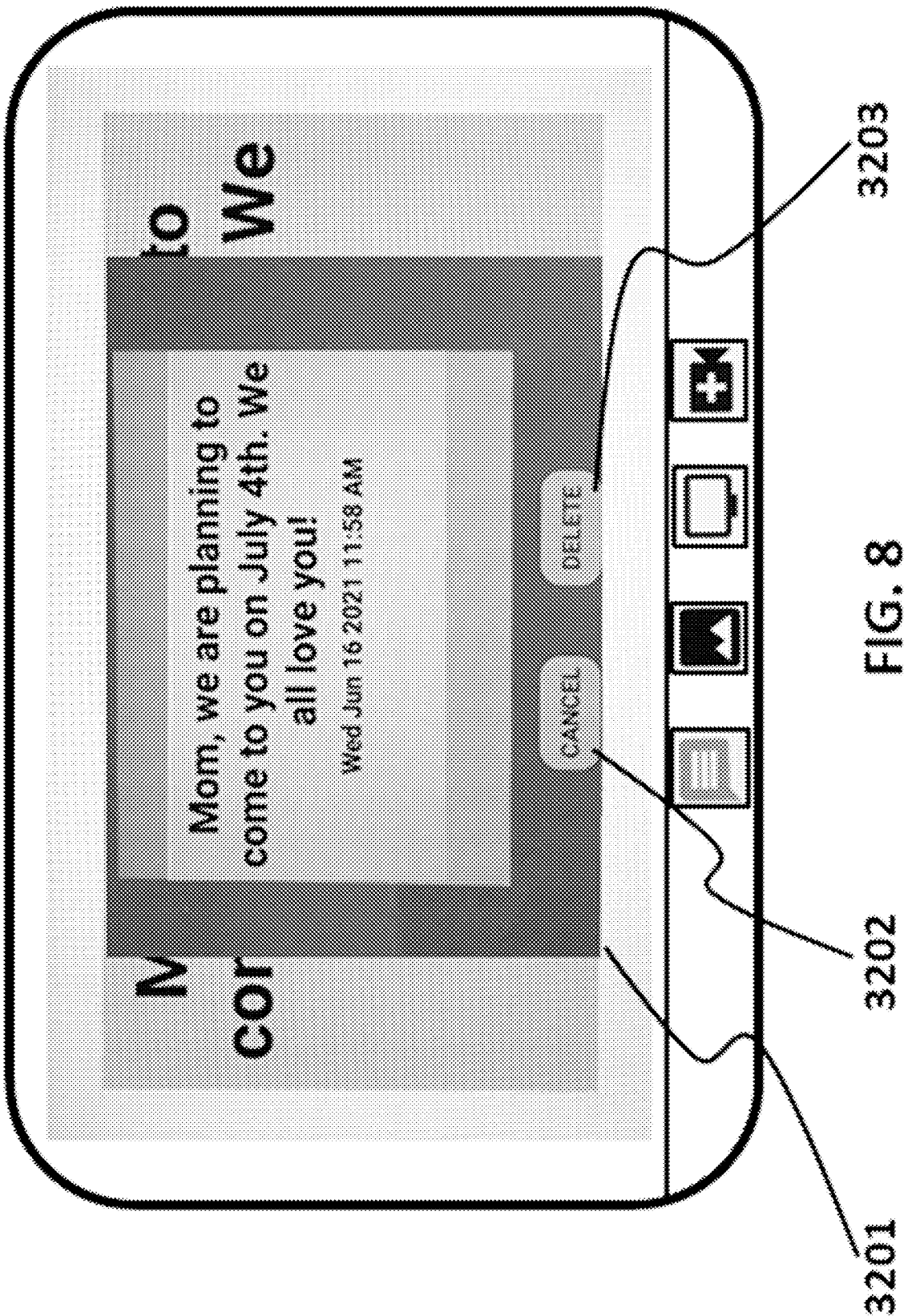
FIG. 8 shows a schematic view of the function of deleting a message from a D-Terminal according to one embodiment of the disclosed system and method.

FIG. 8 shows the post deleting view 3201 from which the user deletes the selected post from the terminal playlist and its local cache. The steps for deleting a post: (1) using the three content navigation buttons located at the bottom of the screen to navigate to the to-be-deleted post, while the post is still displaying or playing on the screen, tap the screen to bring up the popup menu; (2) click the DELETE 2906 button of the popup menu in FIG. 5 to bring up the post deleting view 3201 with the to-be-deleted post selected in the view; (3) click the DELETE 3203 button to delete the post or the CANCEL 3202 button to abandon the operation.

Figure 9:
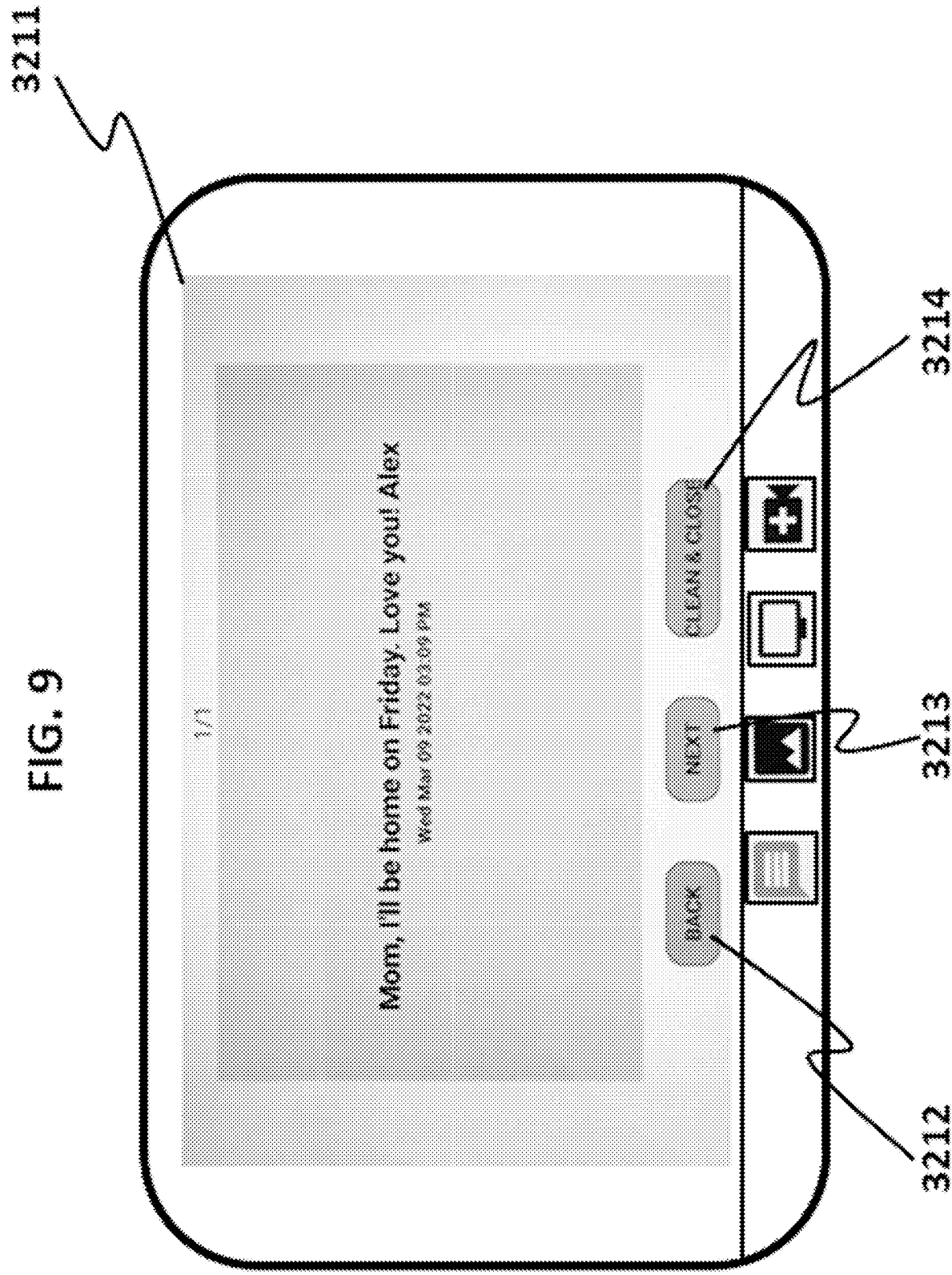
FIG. 9 shows a schematic view of the function of browsing new messages posted to a terminal according to one embodiment of the disclosed system and method.

FIG. 9 shows the new post browser view 3211 which can be launched by clicking on the new post notifier 2209 of FIG. 4. Upon the arrival of new posts, a terminal immediately shows the stacked new posts in the notifier 2209 view at the bottom-right corner of the screen with the most recent post at the top. Clicking the notifier at the corner brings up this new post browser 3211. The user can step back and forth the received new posts by clicking the BACK or the NEXT button. Clicking the CLEAN & CLOSE button empties the notifier buffer and dismisses the browser and the notifier views. The screen returns to auto play mode. For the D-Terminal, all new posts will be added to the playlist and join the auto play process, but for the C-Terminal, the new posts are deleted from the terminal once the new post browser is closed. Therefor any posts sent to the C-Terminal can only be viewed once in the new post browser. This is an intended behavior for C-Terminal designed to simplify the terminal operation.

Figure 10:
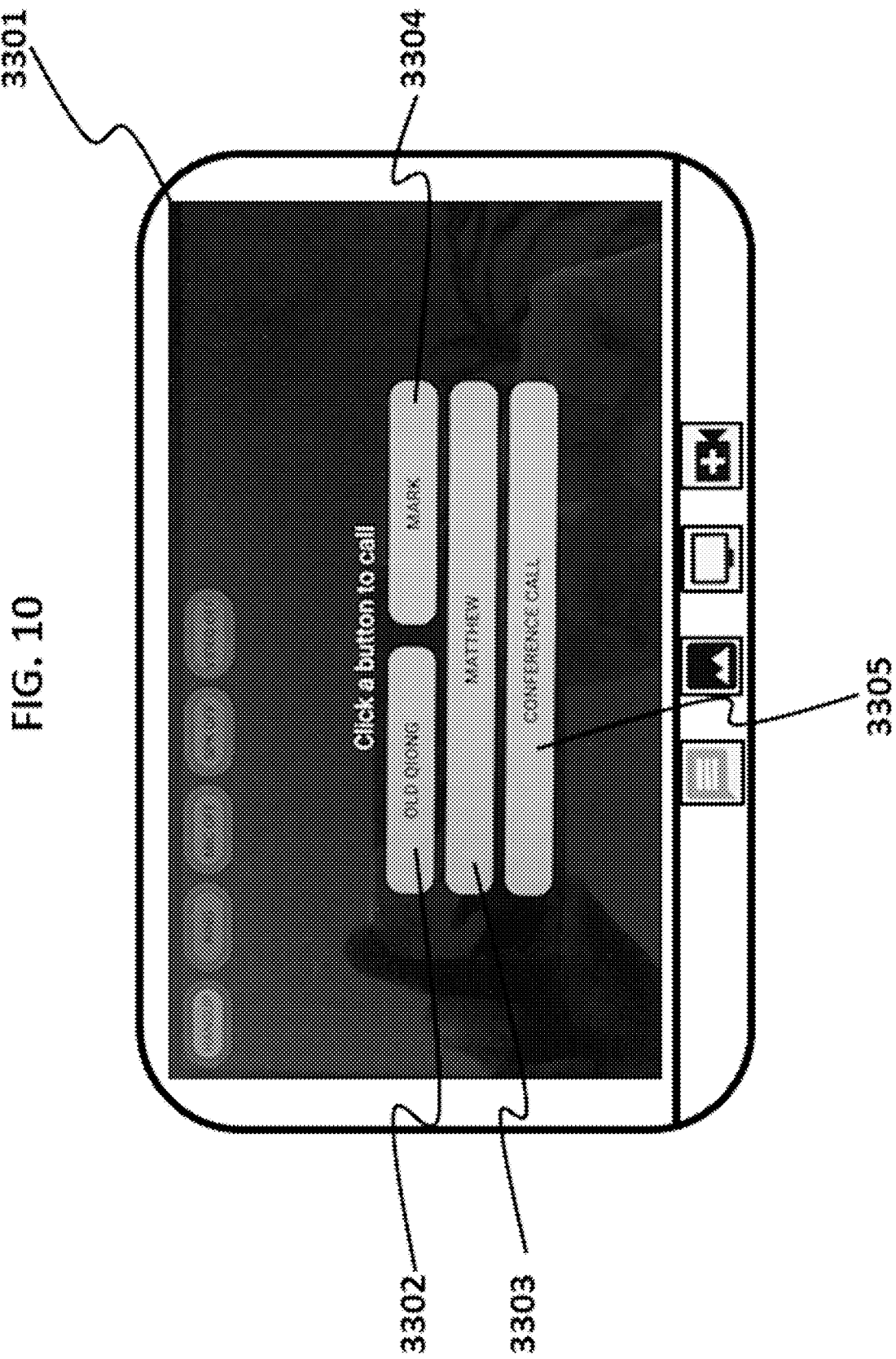
FIG. 10 shows a schematic view of the function of making video call from a terminal according to one embodiment of the disclosed system and method.

FIG. 10 shows the video call initialization view 3301 that is displayed when the user clicks on the video call icon 2205 of FIG. 4. From this view, the user can simply click on any of the terminal names, such as OLD QIONG 3302, MATTHEW 3303 and MARK 3304, to start a video call to the terminal. Optionally, the user can click on CONFERENCE CALL 3305 to start a conference call that invites, typically, more than 2 terminals to join the call. The names of the terminals that are authorized to be called from this terminal will be displayed in the call initialization view 3301. The terminal authorization steps are disclosed in FIG. 18.

Figure 11:
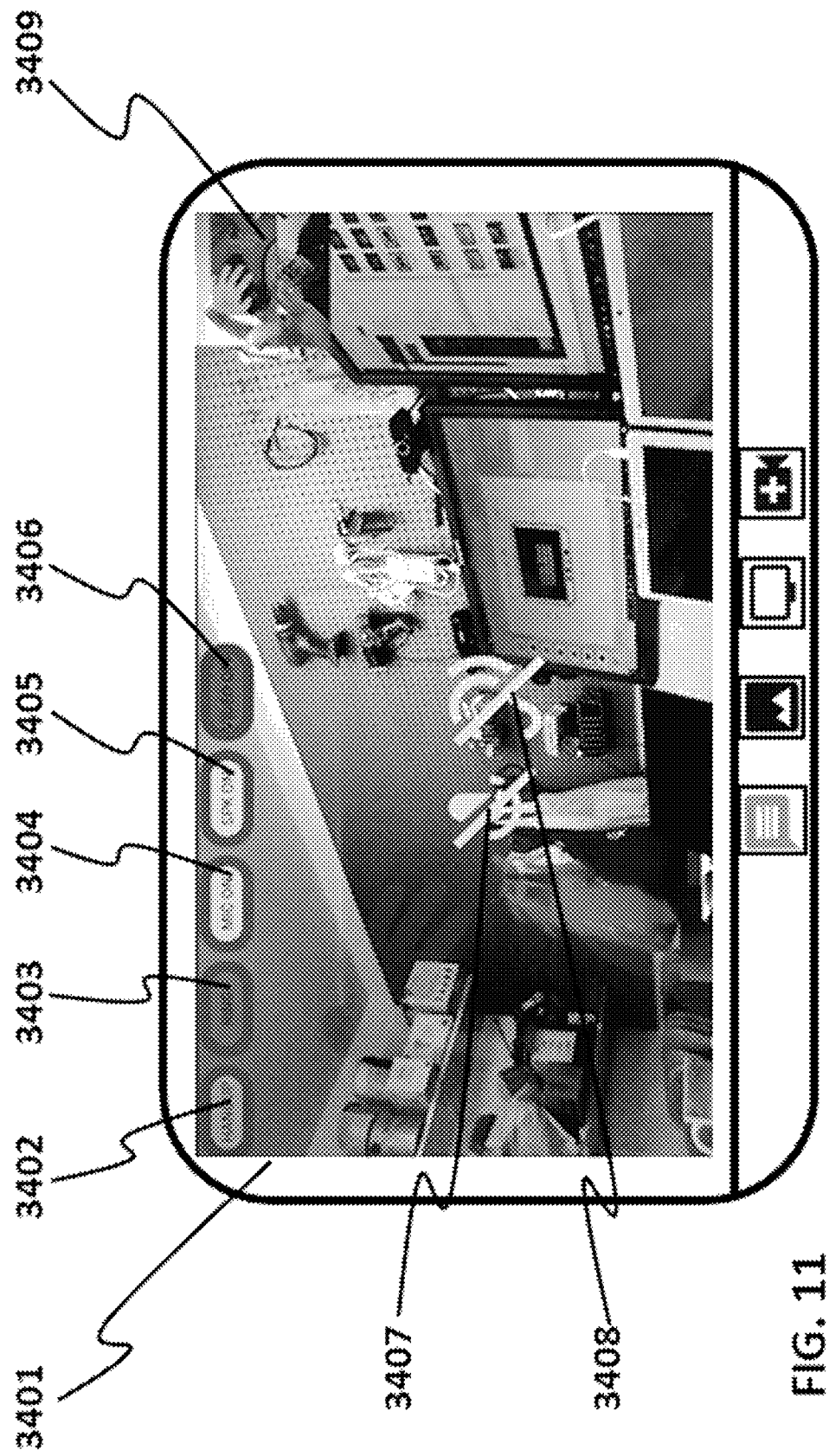
FIG. 11 shows a schematic view of the function of conducting a video call from a terminal according to one embodiment of the disclosed system and method.

FIG. 11 shows the video call view 3401 that will be displayed when the user clicks on a terminal name from FIG. 10. The incoming video stream is shown as the background of the screen. The local video stream 3409 is shown at the top-right corner. On the top of the screen, there are five buttons for video call control: (1) HANGUP 3401 for terminating the video call; (2) RING 3402 for making a doorbell sound on the remote terminal to call for attention; (3) MIC OFF 3404 for muting the microphone. Once the microphone is muted, the label of the MIC OFF button is changed to MIC ON and the Mic-Off icon 3407 appears on the screen. Repeatedly clicking this button toggles the microphone status and causes the Mic-Off icon to appear or disappear alternatively; (4) SPK OFF 3405 for muting the speakerphone. Once the speakerphone is muted, the label of the SPK OFF button is changed to SPK ON and the Spk-Off icon 3408 appears on the screen. Repeatedly clicking this button toggles the speakerphone status and causes the Spk-Off icon to appear or disappear alternatively; (5) VIDEO OFF for turning off the videocam. Once the videocam is off, the label of the VIDEO OFF button is changed to VIDEO ON and the Video-Off icon (not shown in the figure) appears on the screen. Repeatedly clicking this button toggles the videocam status and causes the Video-Off icon to appear or disappear alternatively.

Figure 12:
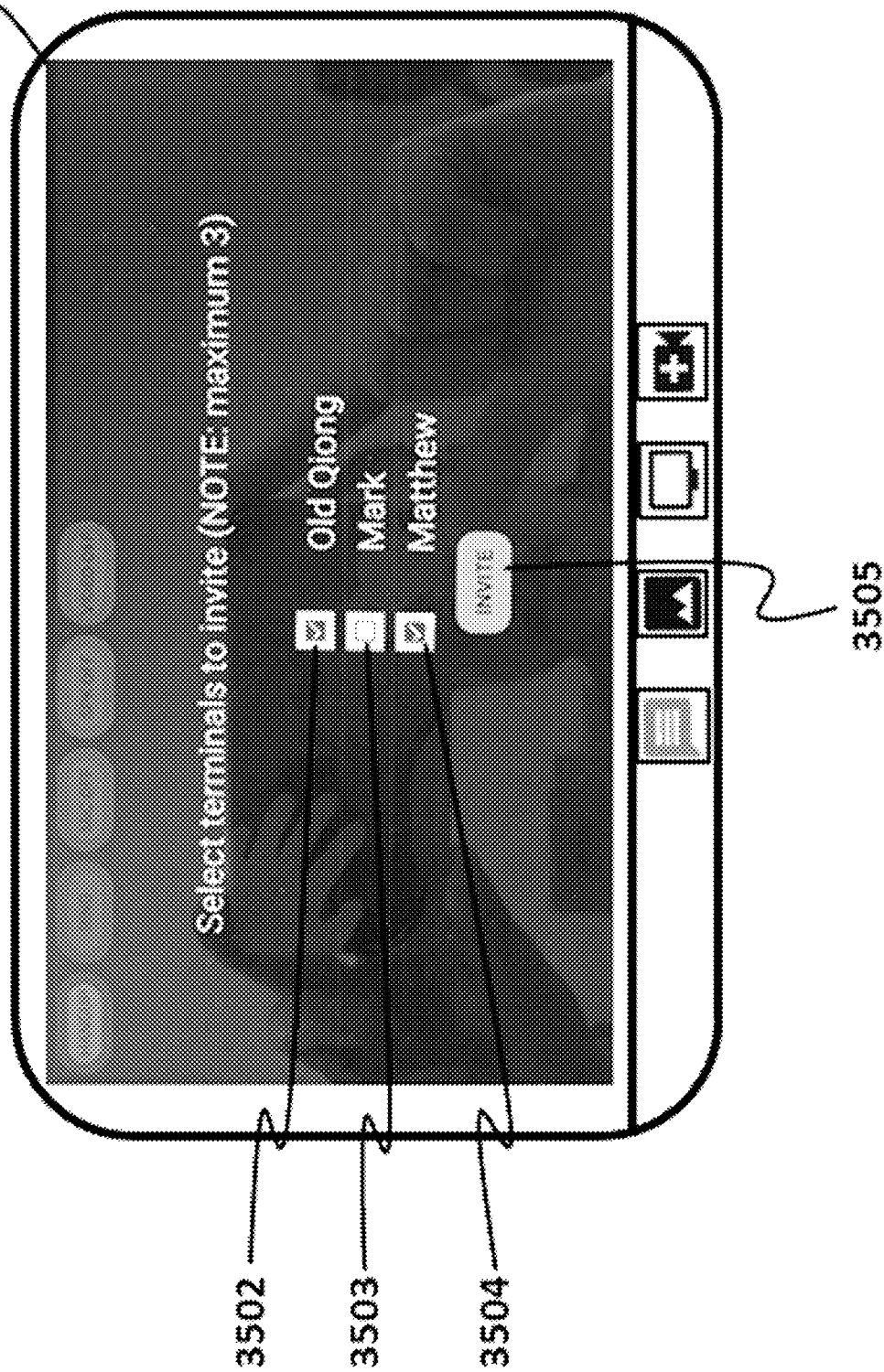
FIG. 12 shows a schematic view of the function of inviting other terminals to join a conference call from a terminal according to one embodiment of the disclosed system and method.

FIG. 12 shows the view for conference invitation 3501 which is displayed when the user clicks on CONFERENCE CALL 3305 of FIG. 10. The names of the authorized terminals are listed here that can be check-marked and invited into the conference, e.g., Old Qiong 3502. Mark 3503 and Matthew 3504. After the user selects the terminals for the call by check-marking the names, clicking INVITE 3505 starts the video conference call as shown in FIG. 13.

Figure 13:
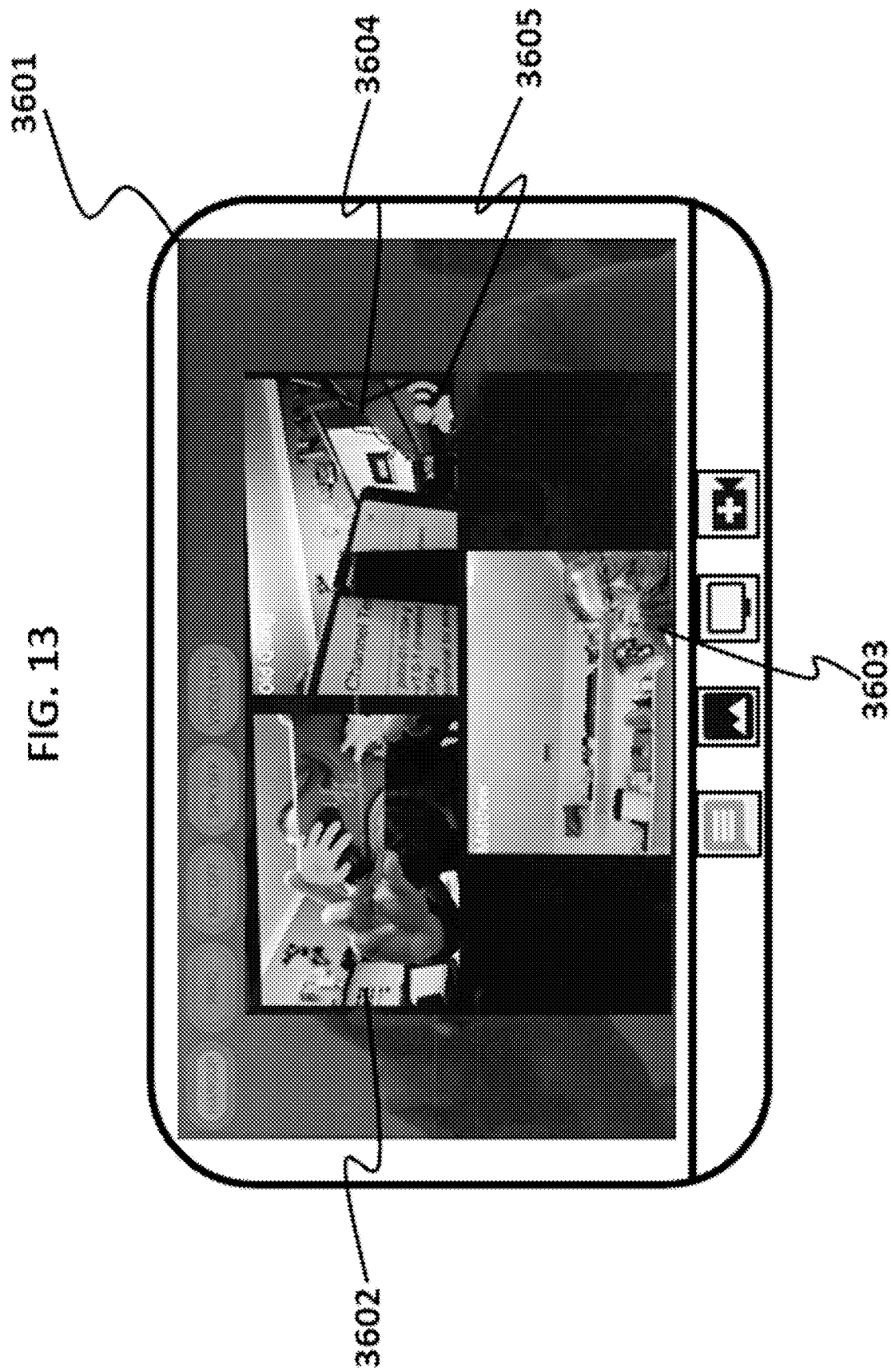
FIG. 13 shows a schematic view of the function of conducting a conference call from a terminal according to one embodiment of the disclosed system and method.

FIG. 13 shows a conference call view 3601 with three participant video streams 3602, 3603 and 3604. The icon 3605, appearing in 3604, indicates this participant is speaking.

Figure 14:
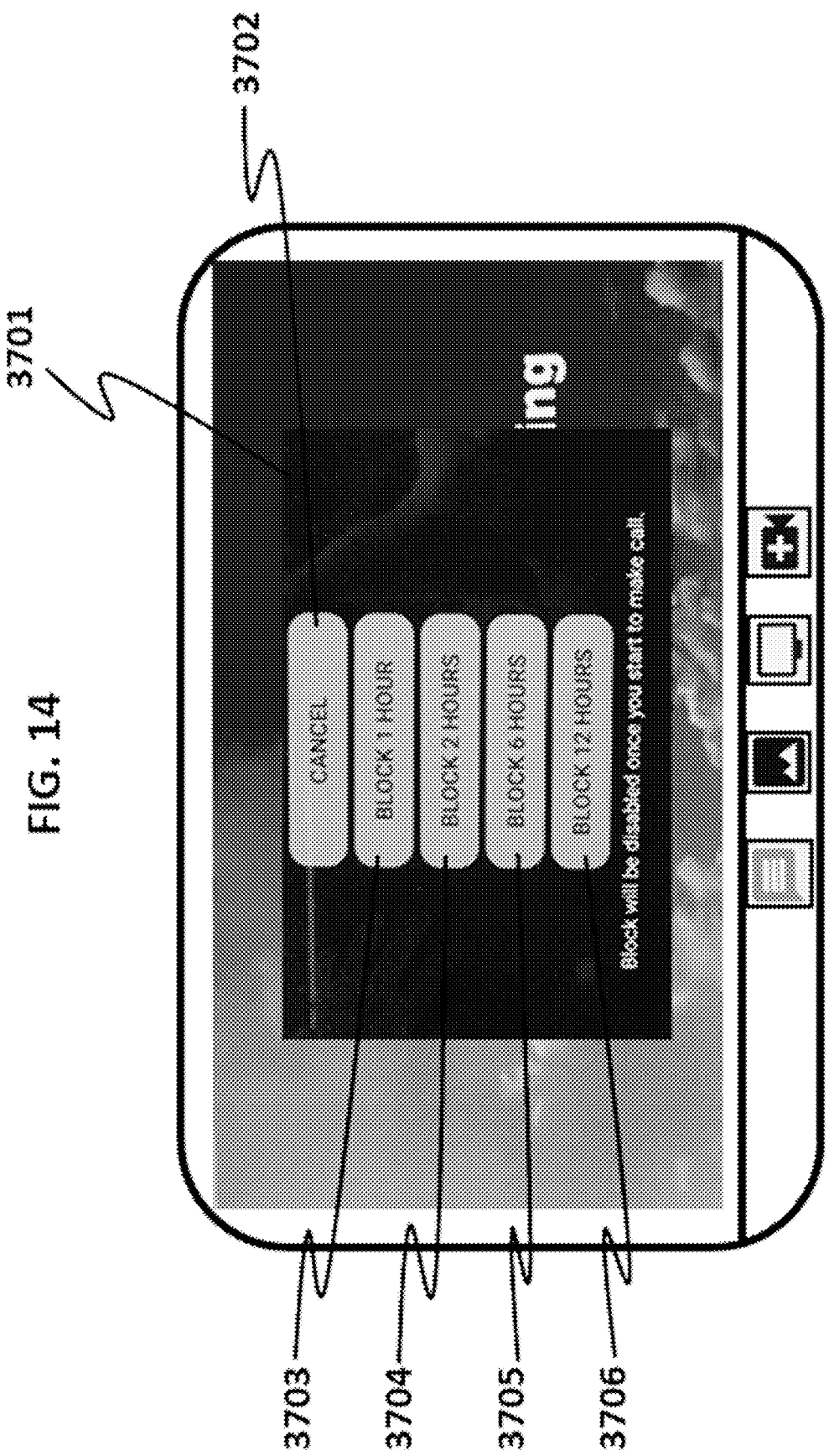
FIG. 14 shows a schematic view of the function of blocking incoming call temporarily from a terminal according to one embodiment of the disclosed system and method.

FIG. 14 shows the menu for selecting call blocking time which is displayed when user clicks on the BLOCK CALL button of FIG. 5. This menu allows incoming call to be temporarily blocked by clicking on button: BLOCK 1 HOUR 3703, BLOCK 2 HOURS 3704, BLOCK 6 HOURS 3705 and BLOCK 12 HOURS 3706. Clicking on any of the buttons causes the Blocking Call status icon to appear at the top-right corner and the menu to be dismissed. When the selected call blocking time is passed, the icon disappears from the top-right corner automatically and the terminal starts to accept calls again.

Figure 15:
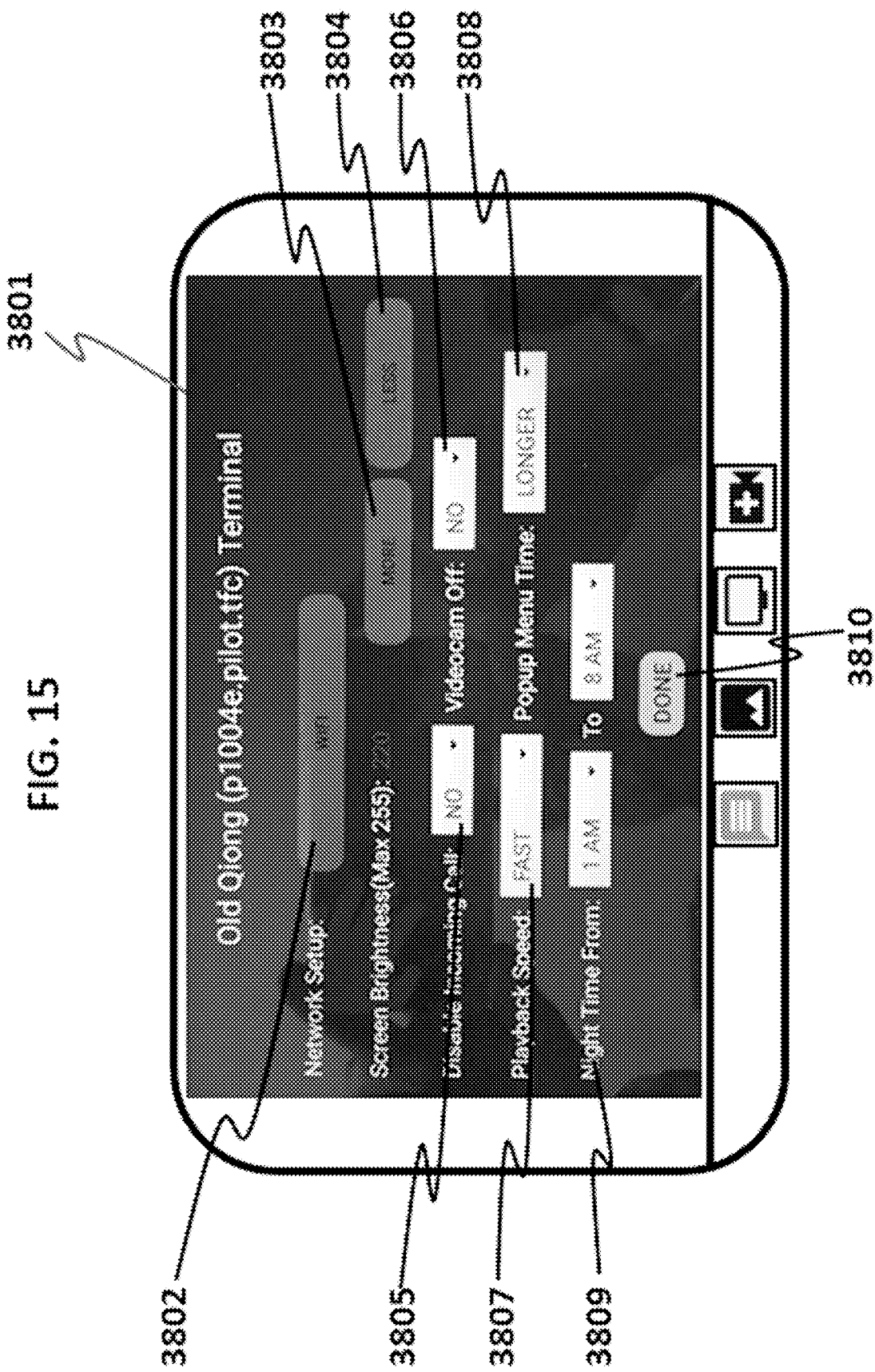
FIG. 15 shows a schematic view of the terminal settings that can be changed from a D-Terminal according to one embodiment of the disclosed system and method.

FIG. 15 shows the view 3801 of the set of settings that can be changed locally from a D-Terminal. The settings include: (1) Network Setup. A click on the WIFI button 3802 will start the process of setting up the WiFi connection for the terminal; (2) Screen Brightness. The buttons MORE 3803 and LESS 3804 are used to increase or decrease the brightness of the screen; (3) Disable Incoming Call. This may be done from the drop-down menu 3805 to set YES or NO; (4) Videocam Off for the terminal. This may be done from the drop-down menu 3806 to set YES or NO; (4) Playback speed for the auto play process. This may be done from the drop-down menu 3807, it can be set as FASTER, FAST, NORMAL, SLOW, SLOWER; (5) Popup Menu Time that determines how long the popup menu to stay on before it disappears automatically. This may be done from the drop-down menu 3808, it can be set as SHORT, LONG and LONGER; (6) Nighttime, which can be set through the drop-down menu 3809. During nighttime, the screen will be black out to enter screen save. The screen can be turned on ("wake up") by simply double-tapping the blacked screen. After the screen is in wake-up mode, the screen goes to black again, for example after one minute, if no further action is taken on the screen. Clicking DONE 3810 to dismiss the setting view, the changed settings will take effect immediately.

Figure 16:
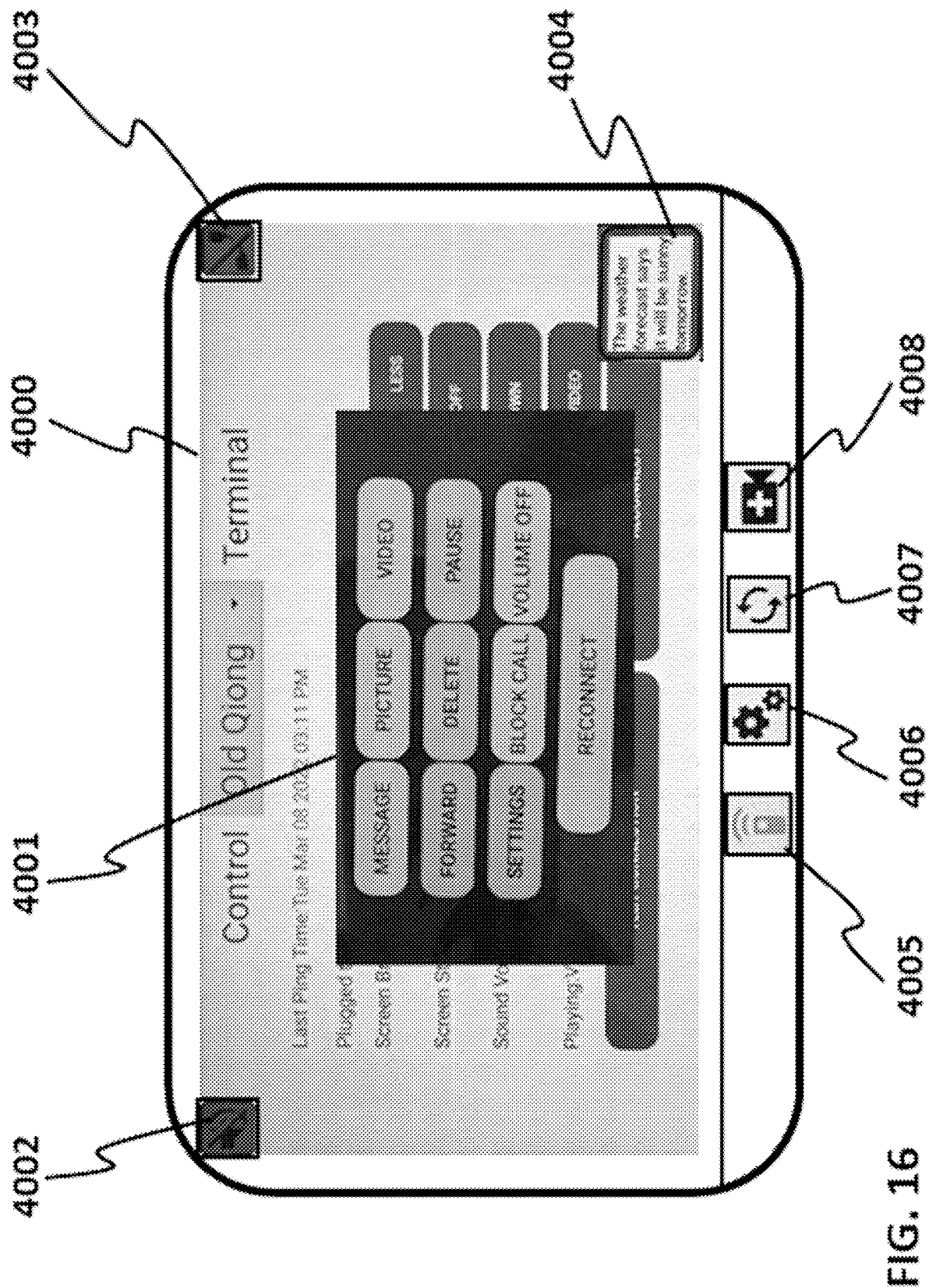
FIG. 16 shows the functional components on the screen of a C-Terminal according to one embodiment of the disclosed system and method.

FIG. 16 shows the functional components on the screen of a C-Terminal 210 in the disclosed embodiment. Among the functional components, some are common to both C-Terminal and D-Terminal and some others are unique to only C-Terminal. The components that are common to both types of terminals include: (1) Popup Menu 4001; (2) Sound Muted icon 4002; (3) Blocking Call icon 4003; (4) New Post Notifier 4004; (5) Video Call icon. For the functional features that are accessed through the buttons of the popup menu but don't apply to C-Terminal, the corresponding buttons are greyed out on the popup menu, e.g. unclickable. The steps for making video call, muting sound, blocking call or browsing new posts on C-Terminal are the same as doing that on the D-Terminal. The components that are unique to C-Terminal include: (1) controller home screen 4000; (2) Remote Control 4005; (3) Remote Configuration 4006; (3) Remote Sync 4007. The features that are accessed through the clickable icons (4005, 4006, 4007) are further disclosed in FIGS. 17, 18, 19 and 20.

Figure 17:
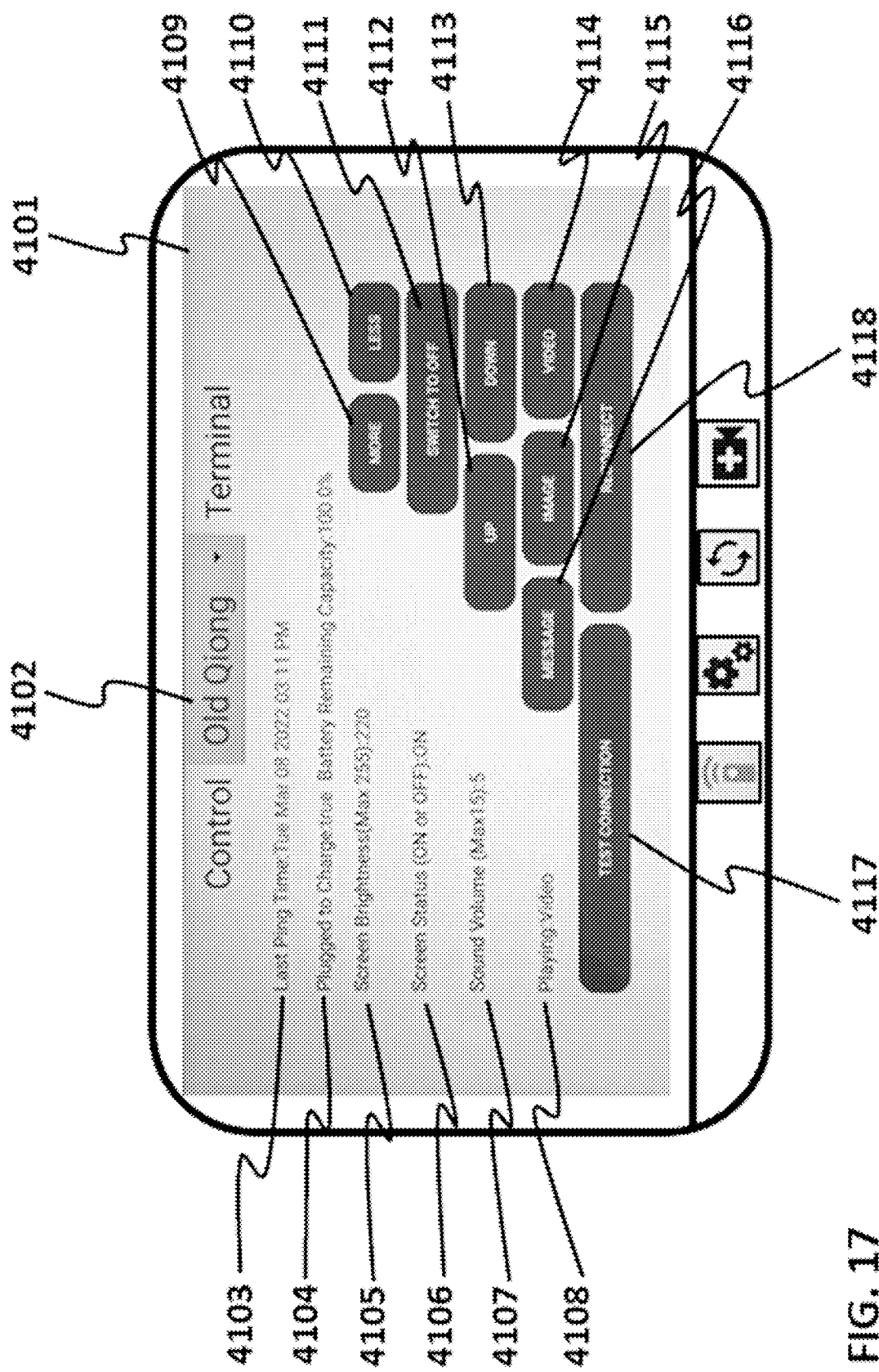
FIG. 17 shows a schematic view of the home screen of the C-Terminal according to one embodiment of the disclosed system and method.

FIG. 17 shows the home screen 4101 of C-Terminal that is displayed when the Remote Control 4005 icon of FIG. 16 is clicked. At any moment, a C-Terminal is always paired with one of the D-Terminals that belong to the T-Group in which the C-Terminal acts at the controller. C-Terminal can switch to pair with different D-Terminals in the T-Group. The drop-down menu 4102 lists all the D-Terminals in the T-Group. By selecting a different D-Terminal from the drop-down menu, user can switch the C-Terminal to pair with the selected D-Terminal. This is the way that the C-Terminal can perform remote control on all the D-Terminals in the T-Group one at a time. Once a C-Terminal is paired with one of the D-Terminals in the T-Group, it will start to send ping command periodically to the paired D-Terminal through the Signaling Server 180 of FIG. 3. Upon receiving a ping from the C-Terminal, the D-Terminal responds to the ping with its own operation status report. This home screen 4101 shows the operation status of the D-Terminals, which includes: (1) Last Ping Time 4103, showing the time of the last status report received; (2) Plugged to Charge 4104 status, showing if the D-Terminal is connected to its charger, the battery remaining capacity; (3) Screen Brightness 4105 setting of the paired D-Terminal; (4) Screen Status 4106 showing whether the screen of the paired D-Terminal is on or off; (5) Sound Volume 4107 setting of the paired D-Terminal; (6) Playing 4108, showing the content type that the paired D-Terminal is currently auto playing, which can be either message or image or video. On the home screen, there are clickable buttons for performing remote control operations to the paired D-Terminal. The set of clickable buttons include: (1) MORE 4109 and LESS 110 for adjusting screen brightness; (2) SWITCH TO OFF (or ON) 4111 for toggling the remote terminal screen to on or off; (3) UP 4112 and DOWN 4113 for adjusting the terminal sound volume; (4) MESSAGE 4116, IMAGE 4115 and VIDEO 4114 for switching the auto play process from one type to another; (5) TEST CONNECTION 4417 for sending a ping command to the paired D-Terminal immediately. If the connection between the C-Terminal and the D-Terminal is not broken, then the Last Ping Time should be updated following the ping command; (6) RECONNECT 4118 for restarting the paired D-Terminal causing it to reestablish connections with the system. This is the same operation as clicking on the RECONNECT 2911 button of the popup menu of the D-Terminal (see FIG. 5).

Figure 18:
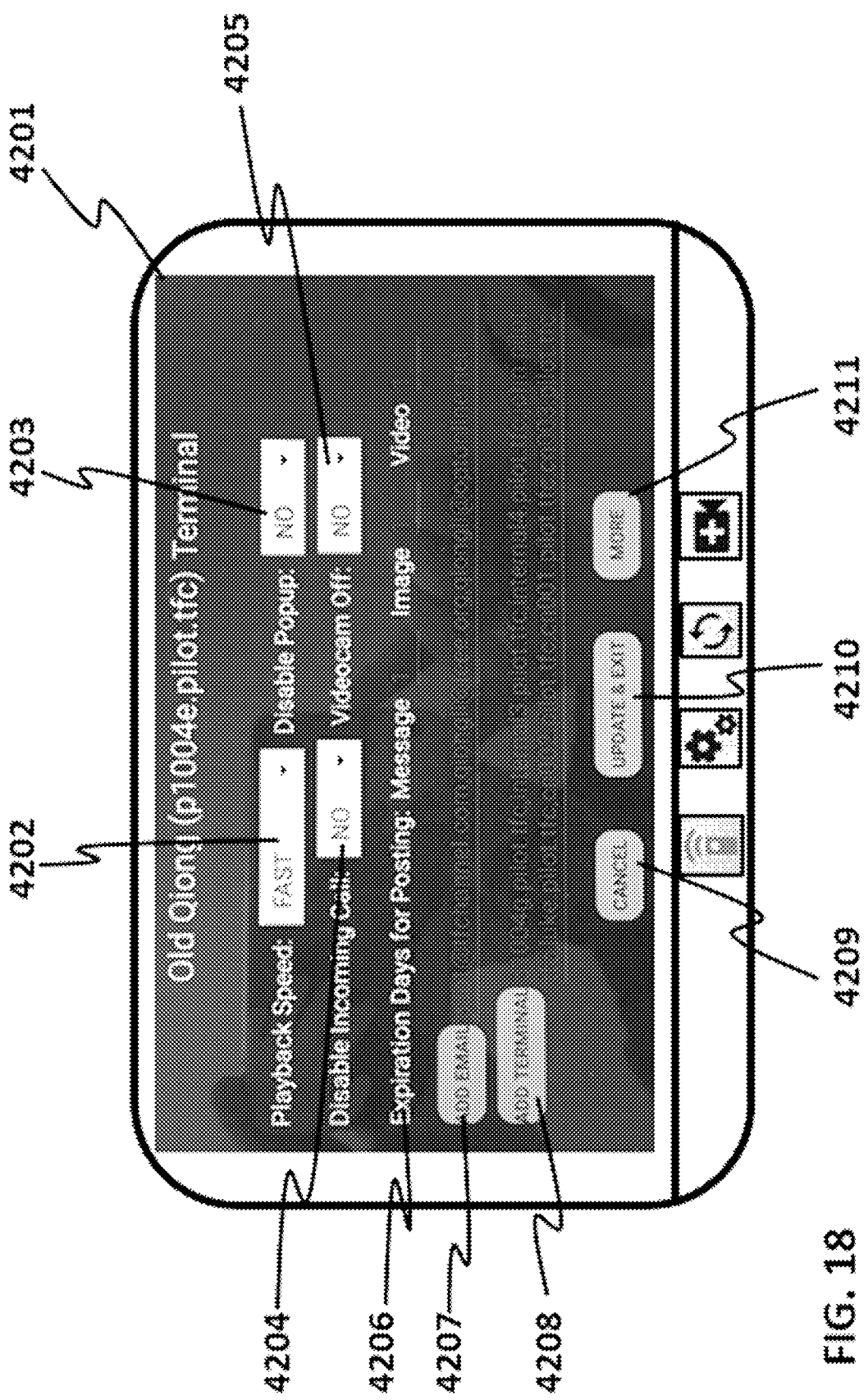
FIG. 18 shows a schematic view of the first remote configuration screen of the C-Terminal according to one embodiment of the disclosed system and method.

FIG. 18 shows the first screen of settings that a C-Terminal can change for the paired D-Terminal remotely. The set of settings includes: (1) Playback Speed for the auto play process. From the drop-down menu 4202, it can be set as FASTER, FAST, NORMAL, SLOW, or SLOWER. The same setting can also be changed locally on the D-Terminal as shown in FIG. 15; (2) Disable Popup. From the drop-down menu 4203, select NO to allow popup menu to be displayed or YES to disallow popup menu to be displayed on the paired D-Terminal; (3) Disable Incoming Call. From the popup-menu to select NO to allow incoming call or YES to disallow incoming call on the paired D-Terminal. The same setting can also be changed locally on the D-Terminal as shown in FIG. 15; (4) Videocam Off. From the drop-down menu, select YES to set all calls on this paired D-Terminal to be audio only by default or NO to set all calls to be audio and video by default. The same setting can also be changed locally on the D-Terminal as shown in FIG. 15; (5) Expiration Days for Posting. This setting controls how many days the posts received by the paired D-Terminal will be remaining on the playlists. Expired posts will be deleted from the playlists therefore removed from the auto play process. The default expiration time for all three types of posts is 7 days; (6) ADD EMAIL 4207 button adds an email address to the list of email addresses that are authorized to allow send posts to the paired D-Terminal through the added email address; (7) ADD TERMINAL 4208 button adds a D-Terminal ID to the list of terminal IDs that are authorized to allow make calls with this paired D-Terminal or post to each other; (8) CANCEL 4209 button abandons the changes made in the settings; (9) UPDATE & EXIT button pushes all the setting changes made from this screen to the paired D-Terminal through the servers of the system; (10) MORE 4211 button navigates to the next remote settings screen.

Figure 19:
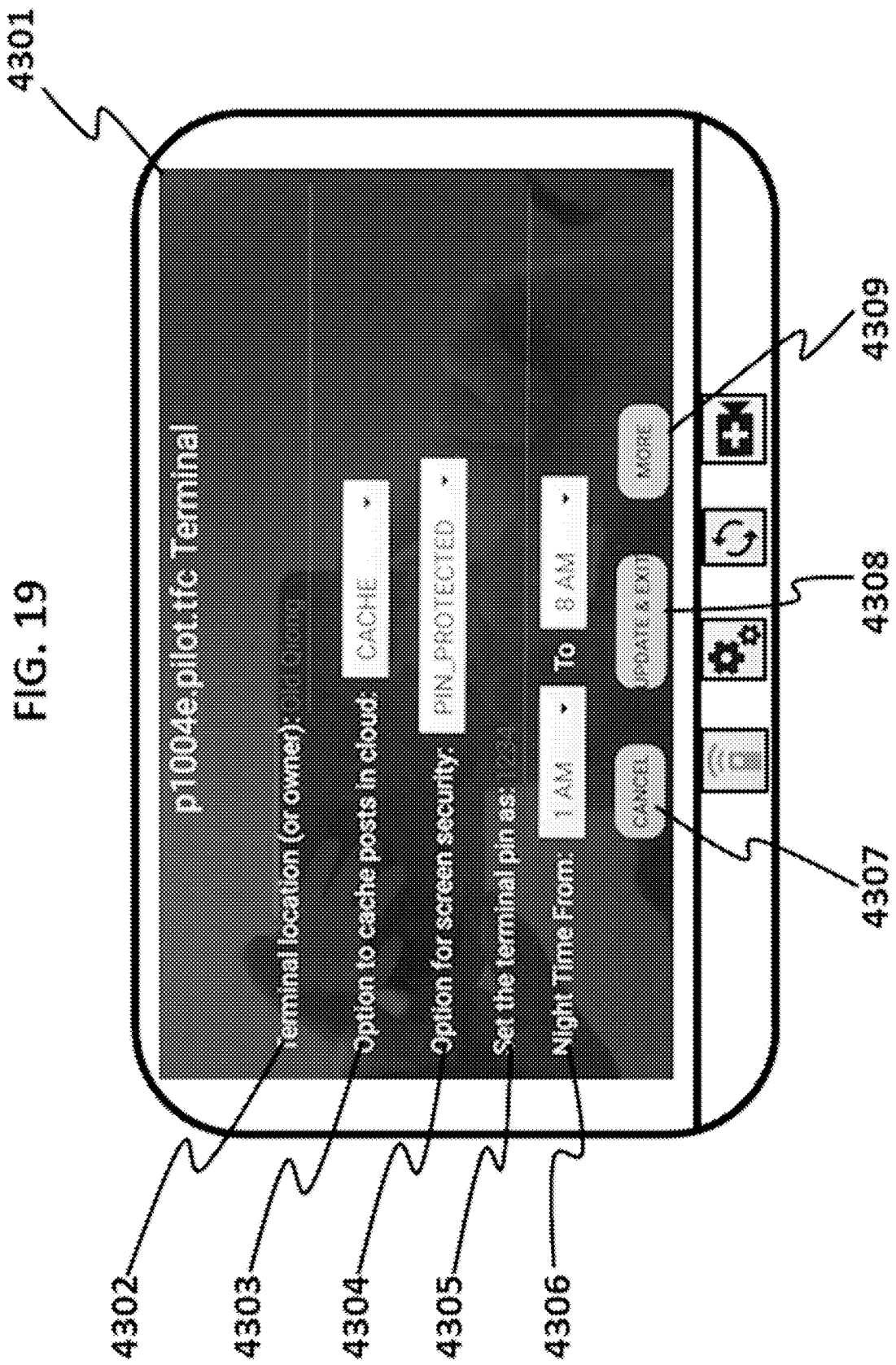
FIG. 19 shows a schematic view of the second remote configuration screen of the C-Terminal according to one embodiment of the disclosed system and method.

FIG. 19 shows the second screen of settings that a C-Terminal can change for the paired D-Terminal remotely. The set of settings includes: (1) Terminal Location (or Owner) 4302 for specifying the recognizable name to represent the primary user of the paired D-Terminal; (2) Option to cache posts in cloud 4303. From the drop-down menu to select CACHE to store the posts in cloud so that when the terminal restarts all the posts will be available to be downloaded again or NO CACHE to not store the posts in cloud so that the posts will be stored on the local storage of the terminal device only. The user may choose the latter option due to data security concerns; (3) Option for screen security 4303. From the drop-down menu to select NO_PIN to disable screen pin protection on the paired D-Terminal or PIN_PROTECTED to enable pin protection; (4) Set the terminal pin 4305. Enter a string here to set the pin for the screen; (5) Nighttime 4306 sets the time range of the nighttime for the paired D-Terminal. During the nighttime, the screen is black out; (6) CANCEL 4307 button abandons the changes made to the setting on this screen; (7) UPDATE & EXIT 4308 button pushes all the setting changes made from this screen to the paired D-Terminal through the servers of the system; (10) MORE 4211 button navigates to the next remote settings screen.

Figure 20:
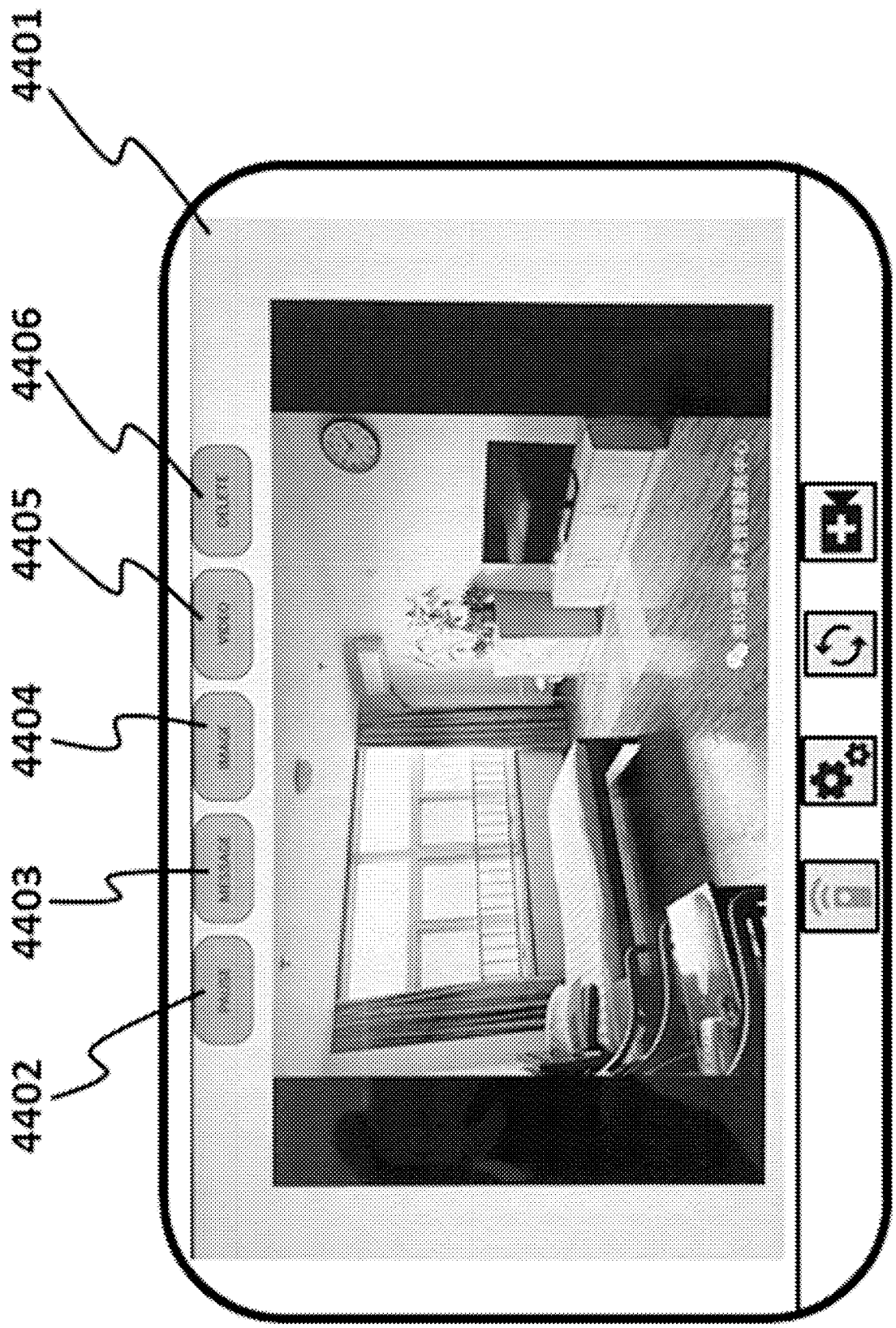
FIG. 20 shows a schematic view of the C-Terminal function of syncing and controlling the auto-play process of the paired D-Terminal according to one embodiment of the disclosed system and method.

FIG. 20 shows the synced view 4401 of the C-Terminal that tracks the auto play of the paired D-Terminal. This synced view displays the same post at the same time as the D-Terminal, so it lets user to know what is currently played on the paired D-Terminal from the C-Terminal. At the top of the view, it provides some buttons for controlling the remote auto play process of the paired D-Terminal. The control operations executed when the buttons are clicked include: (1) PAUSE 4402 for pausing the auto play process on the D-Terminal. Once PAUSE is clicked, the label is changed to START; (2) MESSAGE 4403 for switching the auto play process to start playing message posts; (3) IMAGE 4404 for switching the auto play process to start playing image posts; (4) VIDEO 4405 for switching the auto play process to start playing video posts; (5) DELETE for deleting the current post from the paired D-Terminal.

Figure 21:
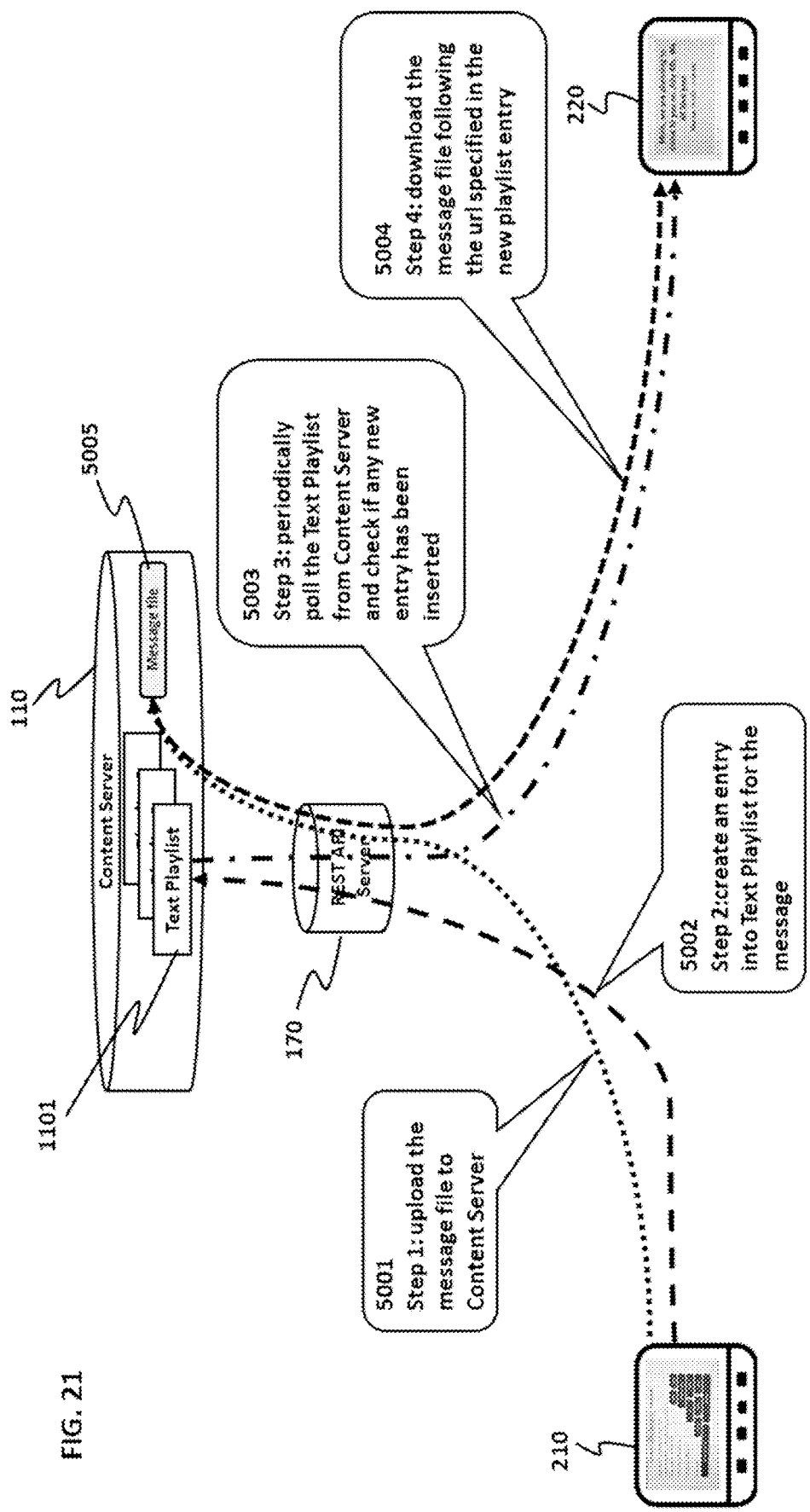
FIG. 21 shows a schematic view and the steps of sending a message from C-Terminal to D-Terminal according to one embodiment of the disclosed system and method.

FIG. 21 shows the mechanism and steps for sending a message post from C-Terminal to D-Terminal. It essentially uses the same mechanism and steps for sending any type of posts between any two terminals in the system. The mechanism involves several components of the system that include: (1) C-Terminal 210; (2) D-Terminal 220; (3) REST API Server 170; (4) Content Server 110; (5) Playlist 1101; (6) Message File 5505. The steps are as follows: Step 1 5001: After the user created a post message on the C-Terminal 210 as illustrated in FIG. 6, the terminal uploads the message to the Content Server 110 through the REST API Server 170. The Content Server saves the message file in local storage and prepares it for downloading to the targeted D-Terminal. Step 2 5002: the C-Terminal 210 also creates an entry into the playlist of corresponding to the message type. In this case it is a text message, therefore the entry will be created into the Text Playlist 1101. Step 3 5003: the D-Terminal periodically polls the playlists that the system maintained for the terminal through the REST API Server 170 and check if any new entry has been inserted into its playlists. Step 4 5004: If the D-Terminal 220 detects any changes in the playlist 1101, it proceeds to download the message file following the URL specified in the new playlist entry and put the downloaded message into its local auto play process and into the New Post Notifier 2209 as shown in FIG. 4. The above 4 steps complete the process of sending a post from one terminal to another.

Figure 22:
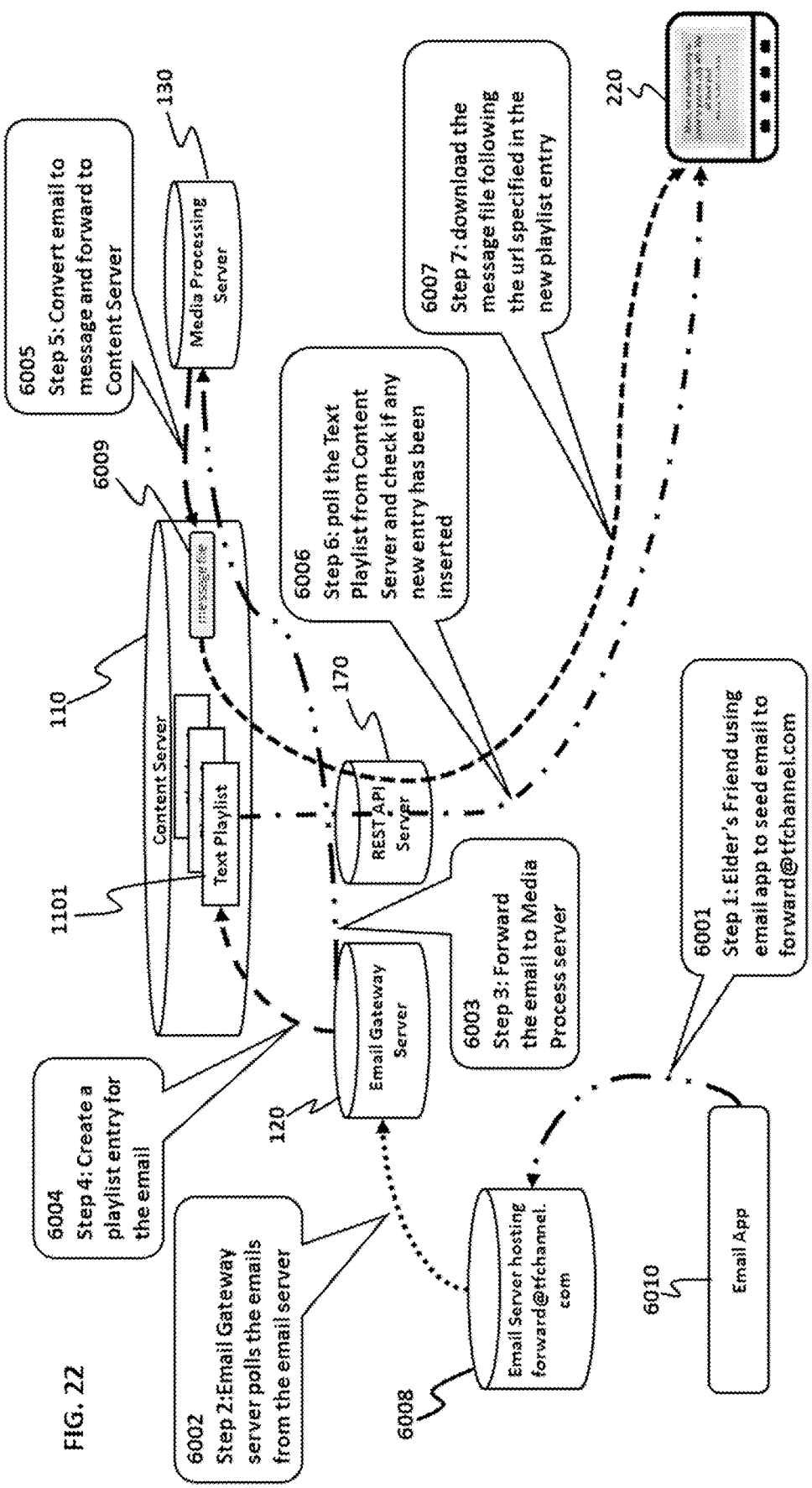
FIG. 22 shows a schematic view and the steps of sending an email to a terminal according to one embodiment of the disclosed system and method.

FIG. 22 shows the mechanism and steps to post to a terminal (C-Terminal or D-Terminal) through email. The user can also post an image and video to a terminal through email by sending them as attachments. The mechanism involves several components of the system that include: (1) Email App 6020; (2) Email Server 6008; (3) Email Gateway Server 120; (4) REST API Server; (5) Content Server 110; (6) Media Processing Server 130; (7) Playlist 1101; (8) Message File 6009; and (9) a terminal device 220. The steps are as the following. Step 1 6001: The user opens an email app 6010 from a computer or any mobile device, such as smartphone device, to send an email with the intended post message as to its content or attachment, to a dedicated email address (for the purpose of illustration, the email address can be forward@tfchannel.com). The email has a subject line that contains a list of terminal IDs to indicate which terminal or a group of terminals are to receive this email post. This email will eventually be forwarded to an Email Server 6008. Step 2 6002: Email Gateway Server 120 periodically polls the Email Server 6008 for any new emails arrived that have the receiver as forward@tfchannel.com. Step 3 6003: Email Gateway Server 120 forwards the received email file to Media Processing Server 130 where the email will be converted into a content file 6009 that can be downloaded and displayed or played by a terminal. Step 4 6004: Email Gateway Server 120 creates a playlist entry into one of the playlists 1101 depending on the post type that are maintained by Content Server 110 for the targeted terminal 220. Step 5 6005: Media Processing Server 130 makes the converted content file 6009 available to Content Server 110 for downloading. Step 6: The terminal 220 periodically polls the Content Server 110 via REST API Server 170 for its playlists 1101 and check if any new entries have been inserted. Step 7: Upon detecting the new entry of the email post in the playlist, the terminal 220 downloads the content file 6009, which can be either text or image or video following the URL specified in the playlist entry. The terminal 220 will then put the downloaded content file 6009 into its local auto play process and into the New Post Notifier 2209 as shown in FIG. 4.

Figure 23:
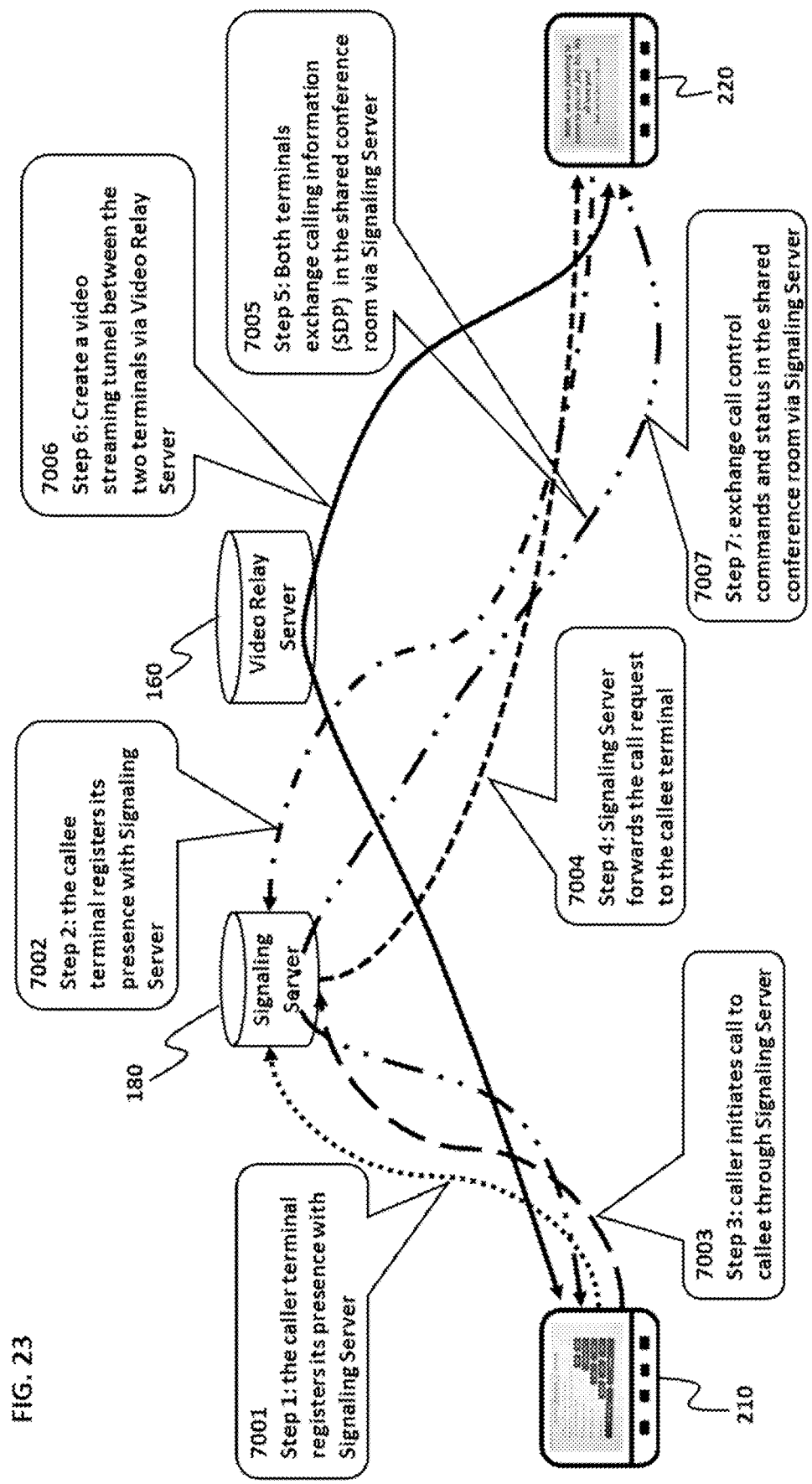
FIG. 23 shows a schematic view and the steps of making video call between terminals according to one embodiment of the disclosed system and method.

FIG. 23 shows the mechanism and steps for making a video call from one terminal to another. The mechanism involves the following components of the system: (1) the caller terminal 210; (2) Signaling Server 180; (3) Video Relay Server 160; (4) the callee terminal 220. The calling steps are as the following. Step 1 7001: When the caller terminal 210 is powered up, it registers its presence with the Signaling Server 180. Step 2 7002: When the callee terminal 220 is powered up, it also registers its presence with the Signaling Server 180. Therefore, the Signaling Server knows the presence of both terminals and can bridge the connection between the two. Step 3 7003: the caller terminal 210 initiates a call request and sends the request to the Signaling Server 180. Step 4 7004: Signaling Server 180 forwards the call request to the callee terminal 220. At the same time, the Signaling Server 180 creates a shared conference room on the server for the caller and callee to exchange call control information via the room. Step 5 7005: Using the shared conference room created temporarily by the Signaling Server 180 for this call session, the caller and callee exchange call initiation and setup information. Step 6 7006: The exchanged call setup information includes the location of the Video Relay Server 160, such as its IP address that the caller and callee can use to establish a data connection tunnel through the relay server for video streaming in bi-direction. With the completion of Step 6, the caller and callee are ready to receive video data exchanged over the tunnel via the relay server. During the call, the caller and callee terminals keep exchanging call control commands or audio status through the shared conference room via the Signaling Server 180. The call control commands include: HANGUP, RING, MIC OFF or ON, SPK OFF or ON, VIDEO OFF or ON, and AUDIO ACTIVE or INACTIVE. Upon receiving the call control commands or audio status, the terminal displays the status icons to indicate the microphone, speakerphone and audio/video conditions as shown in FIGS. 11 and 13 or terminating the call.

Figure 24:
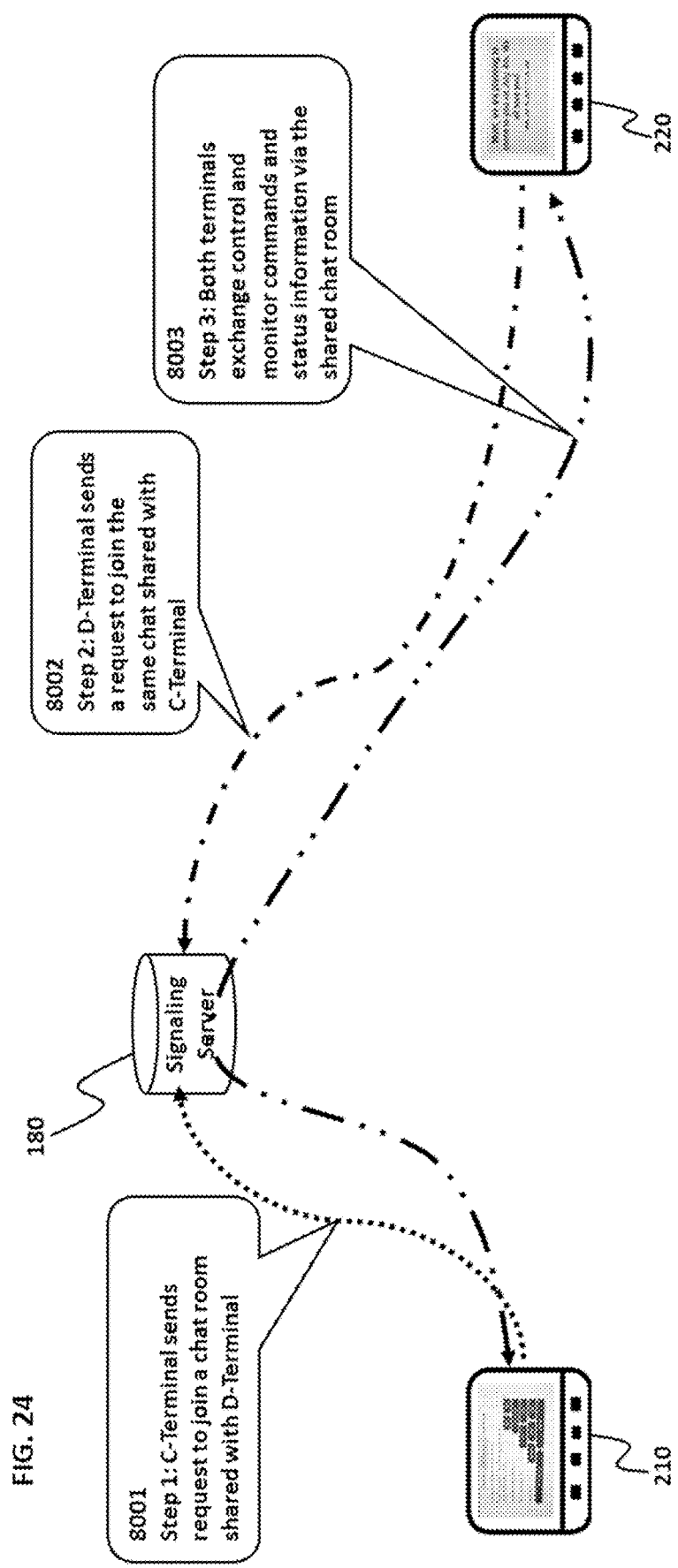
FIG. 24 shows a schematic view and the steps of establishing the control connection between C-Terminal and D-Terminal according to one embodiment of the disclosed system and method.

FIG. 24 shows the mechanism and steps for enabling a C-Terminal to perform constant control and monitoring on the paired D-Terminal. The mechanism involves: (1) C-Terminal 210; (2) Signaling Server 180; (3) D-Terminal 220. The steps are as the following. Step 1 8801: the C-Terminal sends a request to join a chat room that is created by the Signaling Server 180 and shared with the to-be-paired D-Terminal. Step 2 8002: the D-Terminal sends a request to the Signaling Server 180 to join the same chat room as the C-Terminal did in step 1. Step 3 8003: After both terminals are joined in the shared chat room, they can now exchange data through the chat room. The exchanged data include control commands from C-Terminal to D-Terminal, and status report from D-Terminal to C-Terminal. Through this chat room, the C-Terminal and the D-Terminal are now fully paired with each other.

Figure 25:
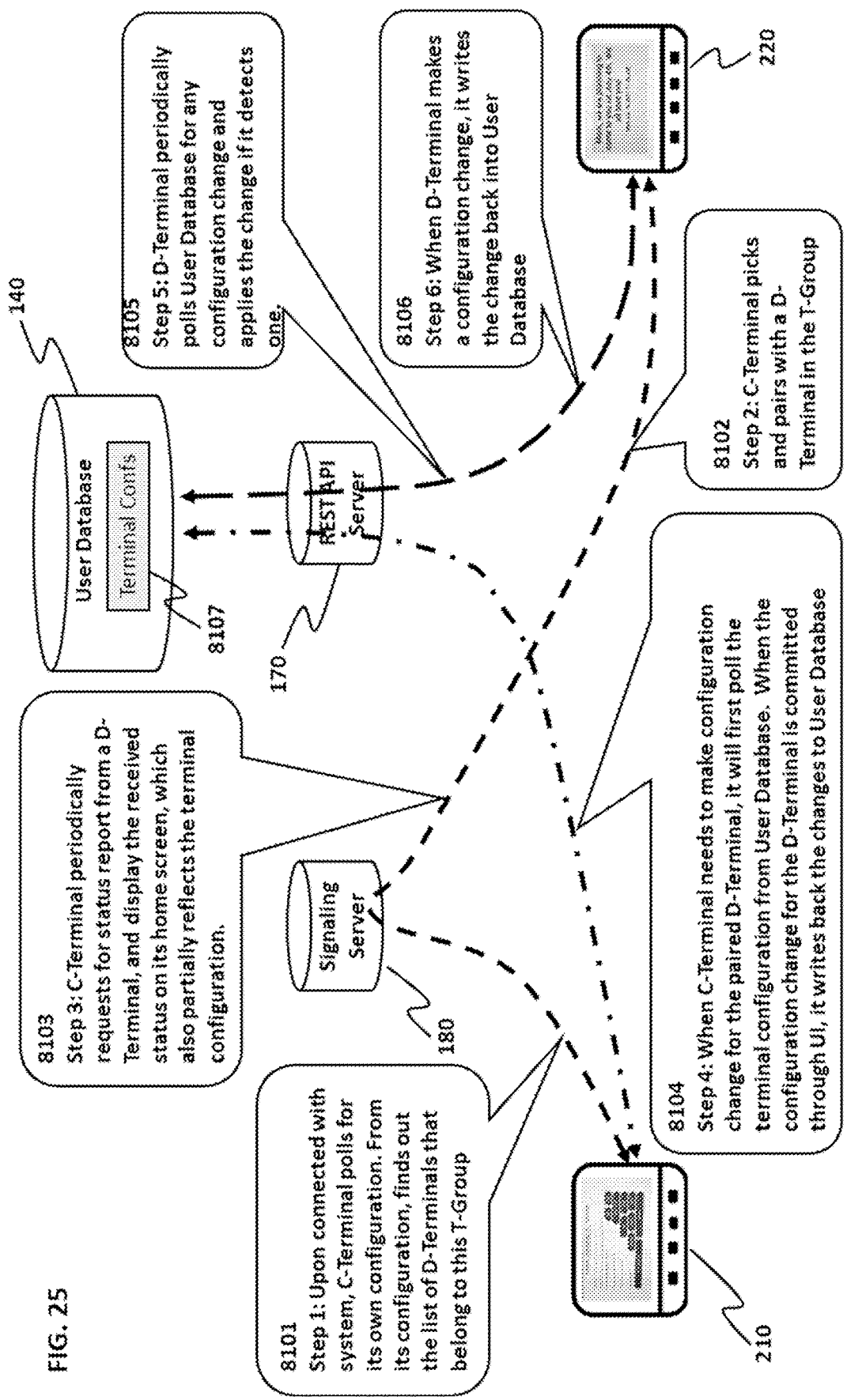
FIG. 25 shows a schematic view and the steps that C-Terminal and D-Terminal jointly take to accomplish remote terminal configuration according to one embodiment of the disclosed system and method.

FIG. 25 shows the mechanism and the steps for a C-Terminal to change the paired D-Terminal configuration remotely. The components involved in the mechanism include: (1) C-Terminal 210; (2) Signaling Server 180; (3) REST API Server 170; (4) User Database 140; (5) the data entries in the database that contains the terminal configurations (Terminal Confs 8107); (5) D-Terminal 220. The steps are as the following. Step 1 8101: Upon connected with system, a C-Terminal 210 polls for its own configuration 8107 from the User Database 140 through REST API Server 170. From its own configuration, it receives the list of D-Terminals that it can pair with and perform control remotely through the Signaling Server 180. Step 2 8102: The C-Terminal picks one of the D-Terminals in the T-Group and follow the steps as described in FIG. 24 to establish the pairing relationship with the D-Terminal. Step 3 8103: Once the pairing relationship is established, the C-Terminal starts to periodically send a ping command to D-Terminal, requesting for the operation status of the terminal. The C-Terminal uses the received status information to refresh its home screen as described in FIG. 17. The received status reports also include information that reflects partially the current configuration of the D-Terminal. Step 4 8104: In order to display the remote configuration screens as described in FIGS. 18 and 19 for user to make configuration changes for the paired D-Terminal, the C-Terminal will first poll for the D-Terminal configurations 8107 from User Database 140 through REST API Server 170. After the user commits the changes that are made through the remote configuration screens for the D-Terminal as shown in FIGS. 18 and 19, the C-Terminal writes back the configuration changes to the User Database 140. Step 5 8105: The D-Terminal 220 periodically polls the User Database 140 for any configuration changes and applies the changes if there are any. Step 6 8106: In case the user makes configuration changes on the D-Terminal 220 itself, the D-Terminal 220 also writes the changes back into the User Database 140. These steps ensure that the C-Terminal and the D-Terminal are both synchronized with the User Database 140 with regards to the D-Terminal configuration.

Figure 26:
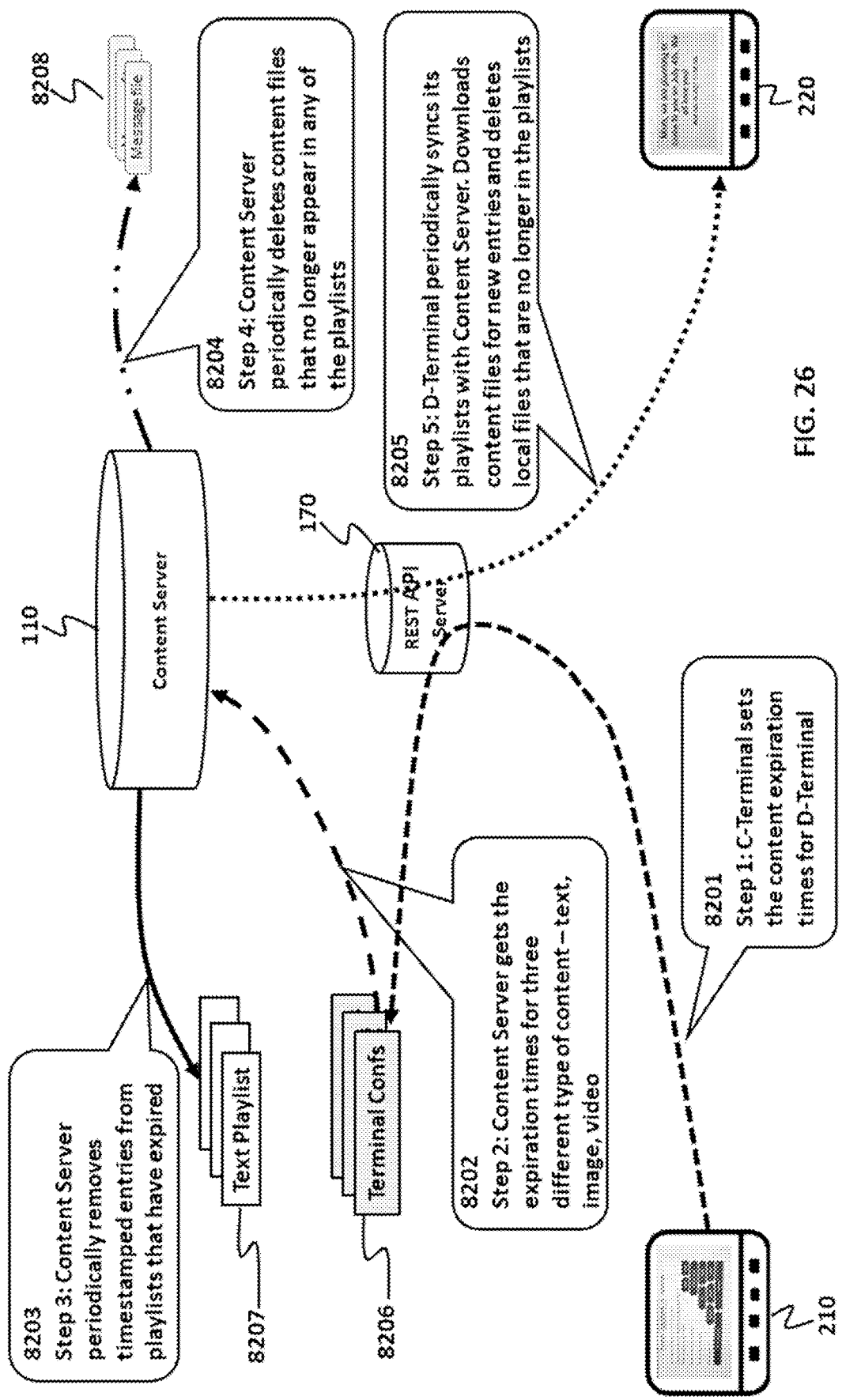
FIG. 26 shows a schematic view and the steps that the system takes to accomplish content management for D-terminals according to one embodiment of the disclosed system and method.

FIG. 26 shows the mechanism and the steps for C-Terminal to perform content management for a paired D-Terminal. The components involved in the mechanism include: (1) C-Terminal 210; (2) REST API Server 170; (3) Content Server 110; (4) Terminal Configuration 8206; (5) Content Playlists 8207; (6) Content Files 8208; (7) D-Terminal 220. Steps are as the following. Step 1 8201: following the steps described in FIG. 25, the C-Terminal 210 sets the content expiration times for the paired D-Terminal which involves the REST API Server 170 and the Terminal Configuration 8206 that are saved in the User Database. The content expiration times, as part of D-Terminal configuration, are described in FIG. 18. Step 2 8202: The Content Server 110 gets the content expiration times of the D-Terminal 220 from its configuration 8206 that are stored in User Database. The expiration times tell the Content Server how long each type of the contents that include text, image, video, should remain on the playlists of the D-Terminal. Step 3 8203: The Content Server 110 goes through each entry on the playlists 8207 periodically and remove entries with timestamps that are expired. Step 4 8208: The Content Server 110 also periodically removes content files 8208 that no longer appear in any of the playlists of the terminals. Step 5 8205: The D-Terminal 220 periodically syncs its playlist with the Content Server 110 through the REST API Server 170. When there are playlists changes, downloads content files for new playlist entries and deletes locally cached content files that are no longer in the playlists. These steps jointly accomplish content management from the C-Terminal for the paired D-Terminal.

Figure 27:
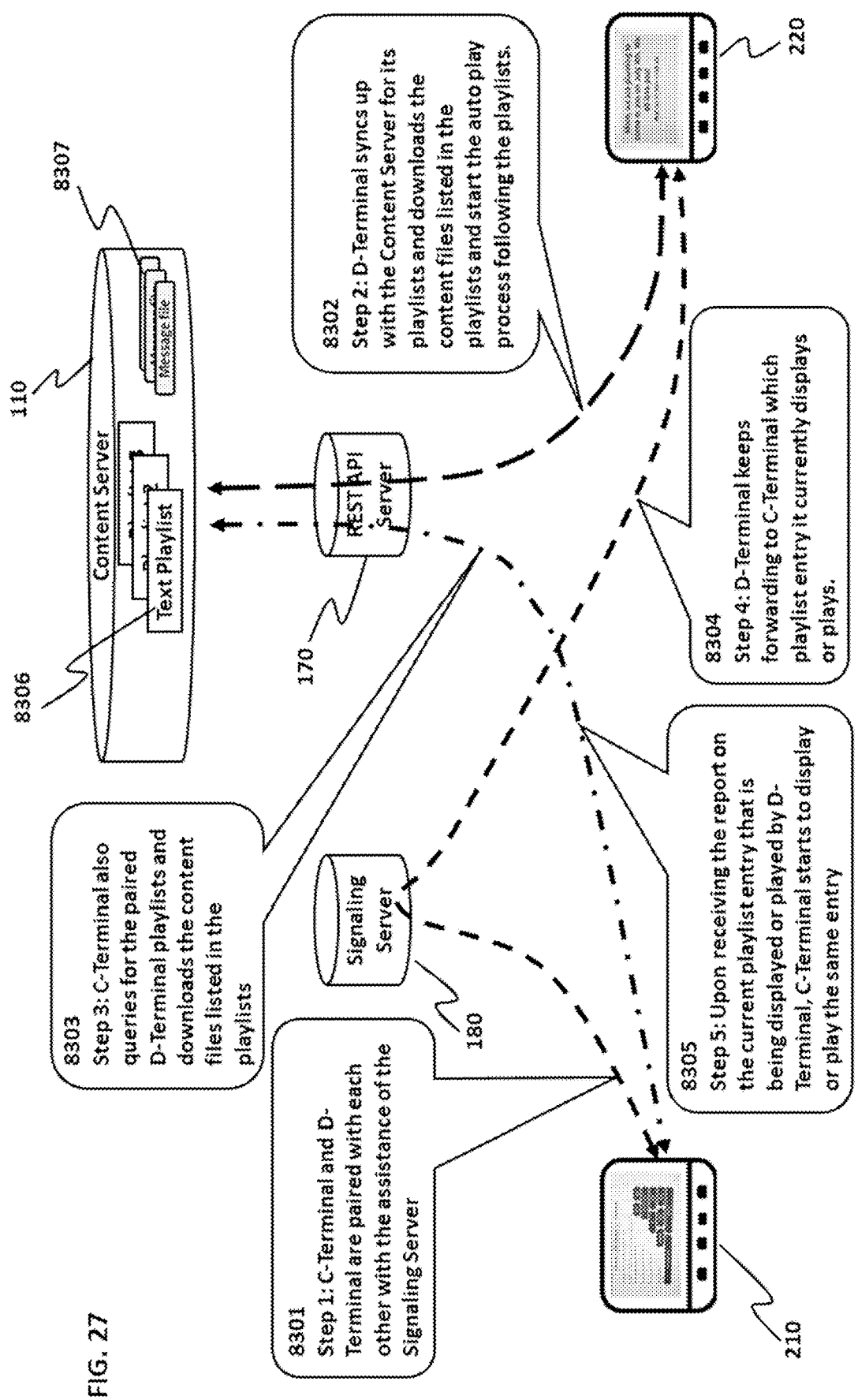
FIG. 27 shows a schematic view and the steps that C-Terminal and D-Terminal jointly take to accomplish auto play synchronization.

FIG. 27 shows the mechanism and the steps for C-Terminal to synchronize with D-Terminal's auto play process. This synchronization process starts on the C-Terminal when user clicks on the Remote Sync icon 4007 of FIG. 16. The components involved in the mechanism include: (1) C-Terminal 210; (2) Signaling Server 180; (3) REST API Server 170; (4) Content Server 110; (5) Playlists 8306; (6) Content Files 8307; (7) D-Terminal 220. The steps are as the following. Step 1 8301: C-Terminal 210 and D-Terminal 220 follows the steps described in FIG. 24 to establish the pairing relationship between the two terminals with the assistance of the Signaling Server 180. Once the C-Terminal 210 is paired with the D-Terminal 220, the D-Terminal 220 can forward its operation status through the connection created for the pairing relationship. Step 2 8302: The D-Terminal 220 syncs up with the Content Server 110 for its playlists and downloads the content files listed in the playlists and kick start the auto play process following the playlists 8306. Step 3 8303: the C-Terminal 210 also queries the Content Server 110 for the playlists of the D-Terminal 220 and downloads the content files listed in the playlists 8306. Step 4 8304: While the auto play process is ongoing, the D-Terminal 220 keeps forwarding to the C-Terminal 210 which playlists entry it currently displays or plays. Step 5 8305: Upon receiving the report on the current playlist entry that is being displayed or played by the D-Terminal 220, the C-Terminal 210 starts to display or play the same entry as illustrated in FIG. 20. This synchronization feature between C-Terminal 210 and D-Terminal 220 provides the ability for the C-Terminal user to monitor what the D-Terminal user is watching. The C-Terminal user can then step into when needed to perform remote control to assist the D-Terminal user to pause, restart, or navigate and select the content to watch, or delete some content from the playlists as described in FIG. 20.

EXAMPLES

The following are examples of the use of this group communication system:

Example A—Family

Family A has two children who are currently out of town in college, and grandpa and grandma live alone in a different city. The family uses the group communication system with 4 terminals. Two placed in the dorms with the college kids, one is placed in the grandpa/grandma's kitchen, and one is placed in the parent's family living room, which serves as the controller terminal of the group. The family is then fully connected even though they are separated geographically. Anyone in the family can use a terminal to connect to others any time. The family members can conveniently have one-to-one individual video calls or family conference calls. Anyone in the family can post privately and securely messages/pictures/videos to any of the terminals. The grandpa and grandma now feel fully integrated into family's digital communication.

Example B—Assisted Living

Family B has an elder living in an assisted living facility. The facility uses the group communication system of the invention to connect families with the elder living in their facility. The facility placed one communication terminal in the elder's living room, and one with Family B. The facility also assigns a dedicated caregiver who also has a terminal that serves as the controller of the group. The caregiver authorizes Family B's terminal to have access only to the terminal in their elder's living room. Now, Family B can check on their loved one anytime. Family B can also interact with the caregiver through the group communication terminal, or even start a conference call with the caregiver and the elder at the same time. The caregiver can also use the communication system to help the elder to make calls back to Family B. Now the family can be constantly engaged in providing quality care to their loved one with the assistance of a professional caregiver.

Example C—Hospital

Hospital C has installed the group communication system terminals in its patient rooms and controller terminals at the nurse stations. With these terminals, nurses can periodically call into the patient rooms to check on their patients' conditions, and patients can also call the nurse station with a simple button click on the terminal screens. A nurse can post patient medicine plans or scheduled tests or personalized entertainment to the patient terminal. More importantly, Hospital C can also lend patient families the group communication terminals temporarily, and through these terminals, families keep constant connection with their loved ones in hospitals.

Example D—Industry Lab

Organization D is a pharmaceutical company that has labs conducting experiments related to medicine development, which need to meet government biosafety regulations. Working in these types of labs, all personnel when entering the labs need to wear special personal protective equipment (PPE). These regulated conditions post big challenges for in-lab scientists to use either mobile phones or even regular landlines in the lab to communicate. It is extremely inconvenient and inefficient for the scientists to de-gown, take off all the PPE, and then put them back on again just because they need to go to next lab to check instrument readings, or pick up needed items or lab materials. Organization D installed the group communication terminals in its labs to simplify inter-lab communications, discussion, and information sharing, which facilitates smoother collaboration and improves lab productivity.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents. The concepts disclosed here may be applied to implement similar systems with varying embodiments to accomplish the same functional objectives. The scope of the invention is defined by the appended patent claims.

The invention claimed is:

1. A system to enable communication, wherein the system comprises:
at least one display terminal;
a control terminal;
at least one backend server, wherein the at least one backend server:
utilizes the control terminal to authorize the at least one display terminal, to allow pairing of the at least one display terminal with the control terminal; and
enables communication between the at least one paired display terminal (PDT) and the control terminal;

wherein the control terminal, during the communication, with the PDT:
    monitors, constantly or periodically, a home screen of an operation status of the PDT;
    controls, remotely, an operation of the PDT;
    modifies, remotely, a configuration of the PDT;
    synchronizes, remotely, with the PDT to monitor an auto play process of the synchronized display terminal;
    initiates, a drop-in video call;
    receives, the drop-in video call;
    blocks, temporarily, the drop-in video call;
    notifies, an arrival of a new post;
    transmits, a communication message to the PDT; and
    alters, configuration of the PDT;
wherein the PDT is arranged to:
    initiate the drop-in video call;
    receive the drop-in video call;
    temporarily block the drop-in video call;
    display the shared information;
    notify arrival of a new post;
    alter a list of previous posts;
    transmit the post;
    control a sound;
    change settings of the PDT;
    reboot at least one function of the PDT;
    raise a request to be paired with the controller terminal; and
    execute a remote control command, which is received from the control terminal.

2. A system to enable communication, wherein the system comprises:
    at least one display terminal;
    a control terminal;
    at least one backend server, wherein the at least one backend server:
        utilizes the control terminal to authorize the at least, one display terminal, to allow pairing of the at least one display terminal with the control terminal; and
        enables communication between the at least one paired display terminal (PDT) and the control terminal;
    the control terminal, during the communication, with the PDT:
        monitors, constantly or periodically, a home screen of an operation status of the PDT;
        controls, remotely, an operation of the PDT;
        modifies, remotely, a configuration of the PI)T;
        synchronizes, remotely, with the PDT to monitor an auto play process of the synchronized display terminal;
        initiates, a drop-in video call;
        receives, the drop-in video call;
        blocks, temporarily, the drop-in video call;
        notifies, an arrival of a new post;
        transmits, a communication message, to the PDT; and
        alters, configuration of the PDT;
    wherein each of the PDT comprises a touch screen that implements a user interface (UI), which, is associated with a navigation button that is arranged to:
        switch the auto play process to play the test messages;
        play a multi-media content;
        initiate the drop-in video call;
        navigate through a popup menu;
        provide a list, of menu items including, a post message, a post picture, a post video, a forward, a delete, a pause, a settings, a block call, a mute and a reconnect;
        display the three clickable icons, which appear to indicate a status of the PI)T; and
        exhibit a notifier window to display a summary view of the most recent received posts on the PDT;
    reboot at least one function of the PDT;
    raise a request to be paired with the controller terminal; and
    execute a remote control command, which is received from the control terminal.

3. A system to enable communication, wherein the system comprises:
    at least one display terminal;
    a control terminal;
    at least one backend server, wherein the at least one backend server:
        utilizes the control terminal to authorize the at least one display terminal, to allow pairing of the at least one display terminal with the control terminal; and
        enables communication between the at least one paired display terminal (PDT) and the control terminal;
    the control terminal, during the communication, with the PDT:
        monitors, constantly or periodically, a home screen of an operation status of the PDT;
        controls, remotely, an operation of the PDT;
        modifies, remotely, a configuration of the PDT;
        synchronizes, remotely, with the PDT to monitor an auto play process of the synchronized display terminal;
        initiates, a drop-in video call;
        receives, the drop-in video call;
        blocks, temporarily, the drop-in video call;
        notifies, an arrival of a new post;
        transmits, a communication message to the PDT; and
        alters, configuration of the PDT;
    wherein the control terminal comprises a touch panel to display a graphical user interface (GUI) that comprises a set of navigation buttons, which is arranged to:
    show the home screen that allows the control terminal to be paired with the at least one display terminal;
    display an operation status of the PDT;
    display:
        a navigation button appearing as an;icon to show a remote configuration to remotely configure the PDT; and
        a synchronization screen to enable the auto play process of the PDT;
        provide, upon receiving a tapping command, a list of menu items corresponding to initialization of transmission of a message, an image and a video; and
        display a notification window to present an outline view of the latest received post to the control terminal;
    wherein the remote configuration is arranged to:
        set a playback speed;
        enable or disable the popup menu;
        enable or disable the incoming drop-in video call;
        enable or disable a video camera;
        set a content expiration time;
        specify the PDT. which is authorized to make the drop-in video call or transmit the posts to the control terminal;
        enable or disable a content cache of the at least one backend server;
        provide a nighttime range settings; and
        apply setting command to trigger changes to the selected paired display terminal.

4. A method for enabling communication, wherein the method comprising:
arranging at least one backend server for:
utilizing a control terminal to authorize at least one display terminal, to allow pairing of the at least one display terminal with the control terminal; and
enabling communication between the at_least one paired display terminal (PDT) and the control terminal;
performing by the control terminal, during the communication with the PDT:
monitoring, constantly or periodically, a home screen of an operation status of the PDT;
controlling, remotely, an operation of the PDT;
modifying, remotely, a configuration of the PDT;
synchronizing, remotely, with the PDT to monitor an auto play process of the synchronized display terminal;
initiating, a drop-in video call;
receiving, the drop-in video call;
blocking, temporarily, the drop-in video call;
notifying, an arrival of a new post;
transmitting, a communication message to the PDT; and
altering, configuration of the PDT;
wherein each of the PDT comprises a touch screen that implements a user interface (UI), which is associated with a navigation button that is arranged to:
switch the auto play process to play the test messages;
play a multi-media content;
initiate the drop-in video call;
navigate through a popup menu;
provide a list of menu items including a post message, a post, picture, a post video, a forward, a delete. a pause, a settings, a block call, a mute and a reconnect;
display the three clickable icons, which appear to indicate a status of the PDT;
and
exhibit a notifier window to display a summary view of the most recent received posts on the PDT.

5. The method of claim 4, wherein the indicated display terminal status is selected from a call blocked detail, a pause status of the auto play process, and a mute condition of the sound.

6. The method of claim 4, wherein the is associated with a clickable button that enables toggle between the indicated terminal status of the each of the display terminal, or out from the indicated terminal status.

7. The system of claim 1, wherein the control terminal comprises a touch panel to display a gaphical user interface (GUI) that comprises a set of navigation buttons, which is arranged to:
show the home screen that allows the control terminal to be paired with the at least one display terminal;
display an operation status of the PDT;
display:
a navigation button appearing as an icon to show a remote configuration to remotely configure the PDT; and
a synchronization screen to enable the auto play process of the PDT;
provide, upon receiving, a tapping command, a list of menu items corresponding to initialization of transmission of a message, an image, and a video; and
display a notification window to present an outline view of the latest received post to the control terminal.

8. The system of claim 7, wherein the operation status is selected from a call blocked setting, a pause status of the auto play process and a sound mute condition.

9. The system of claim 1, wherein the control terminal and the display terminal is selected from a tablet, a mobile device. a laptop, a smartphone, a wearable computer, a virtual reality device, an augmented reality device and a server.

10. The system of claim 7, wherein the home screen is configured to implement at least one element of the GUI, wherein the at least one element is selected to:
display a time data to show a latest time, at which the control terminal received the status report, from the PDT;
display a battery status and a charging status of the PDT;
increase or decrease a brightness level of the touch screen of the PDT;
turn ON or OFF. the touch screen of the PDT;
increase or decrease the sound volume of the PDT;
enable navigation of the auto play process of the PDT;
reboot the PDT, remotely; and
transmit an extra ping command to the PDT to test the connection.

11. The system of claim 7, wherein the synchronization screen is configured to implement at least one member of the GUI, wherein the at least one member is selected to:
enable view or play, simultaneously, the information on the touch screen of the PDT;
pause or restart the remote auto play process on the touch screen of the PDT;
allow navigation through the remote auto play process; and
delete the information that is currently displayed on the touch screen of the PDT.

12. The system of claim 1, wherein the control terminal or the at least one backend server utilizes at least one procedure to implement the communication between the control terminal and the PDT, wherein the at least one procedure:
shares the information;
posts the information in the group;
enables transmission of a first information from the at least one external computing device;
initiates the drop-in video call in the group; and
synchronizes with the PDT, to monitor and control, the auto play process of the synchronized paired display terminal.

13. The method of claim 5, wherein the control terminal comprises a touch panel to display a graphical user interface (GUI) that comprises a navigation icon, which is arranged to:
show the home screen that allows the control terminal to be paired with the at least one display terminal;
display an operation status of the PDT;
display:
a navigation button appearing as an icon to show a remote configuration to remotely configure the PDT; and
a synchronization screen to enable the auto play process of the PDT;
provide, upon receiving, a tapping command, a list of menu items corresponding to initialization of transmission of a message, an image and a video; and
display a notification window to present an outline view of the latest received post to the control terminal.

14. The method of claim 4, wherein the PDT is arranged to:
initiate the drop-in video call;

receive the drop-in video call;
temporarily blockage of the drop-in video call;
display the shared information;
notify arrival of a new post;
alter a list of previous post;
transmit the post;
control a sound;
change settings of the PDT;
reboot at least one function of the PDT;
raise a request to be paired with the controller terminal; and
execute, a remote control command, which is received from the control terminal.

15. The method of claim 4, wherein the control terminal and the each of the display terminal is selected from a tablet, a mobile device, a laptop, a smartphone, a wearable computer, a virtual reality device, an augmented reality device and a server.

16. The method of claim 4, wherein the communication message is selected from a text message, a picture message, an audio message and a video message.

17. A system to enable private group communication between individuals, wherein the system comprises:
   a terminal for use by each individual in the private group, each of the terminals virtually connected to each other through an internet system;
   at least one of the terminals is a master terminal and each of the remaining terminals a slave display terminal, wherein the master terminal can individually control each of the slave display terminals;
   at least one backend server that can establish exclusive and private connections over the internet system between each of the terminals, wherein the backend server:
      utilizes the master terminal to authorize the at least one slave display terminal, to allow pairing of the at least one slave display terminal with the master terminal; and
      enables communication between the at least one paired slave display terminal (PDT) and the master terminal;
   wherein the master terminal, during the communication, with the PDT:
      monitors, constantly or periodically, a home screen of an operation status of the PDT;
      controls, remotely, an operation of the PDT;
      modifies, remotely, a configuration of the PDT;
      synchronizes, remotely, with the PDT to monitor an auto play process of the synchronized slave display terminal;
      initiates, a drop-in video call;
      receives, the drop-in video call;
      blocks, temporarily, the drop-in video call;
      notifies, an arrival of a new post;
      transmits, a communication message to the PDT; and
      alters, configuration of the PDT;
   wherein the PDT is arranged to:
      initiate the drop-in video call;
      receive the drop-in video call;
      temporarily block the drop-in video call;
      display the shared information;
      notify arrival of a new post;
      alter a list of previous posts;
      transmit the post;
      control a sound;
      change settings of the PDT;
      reboot at least one function of the PDT;
      raise a request to be paired with the master terminal; and
      execute a remote control command, which is received from the master terminal.

18. The system of claim 17, wherein each of the slave display terminals of a private group comprises a touch screen that implements a user interface (UI), which is associated with a set of navigation buttons. that is arranged to:
   switch the auto play process to play the text messages;
   play a multi-media content;
   initiate the drop-in video call;
   navigate through a popup menu;
   provide a list of menu items including a post message, a post picture, a post video, a forward, a delete, a pause, a settings, a block call, a mute and a reconnect;
   display the three clickable icons, which appear to indicate a status of the slave display terminal; and
   exhibit a notifier window to display a summary view of the most recent received posts on the slave display terminal.

19. The system of claim 17, wherein the master terminal of a private group is arranged to:
   maintain constantly connections with slave display terminals in the same group;
   initiate the drop-in video call;
   receive the drop-in video call;
   temporarily blockage of the drop-in video call;
   receive shared posts from the slave display terminals of the same group;
   browser received posts
   delete shared posts
   trace and display the auto play back process of a slave display terminal;
   perform control and management of the slave display terminals of the same group by sending control and configuration commands to slave display terminals;
   notify arrival of a new post in a notifying window;
   transmit the post;
   control a sound;
   change settings of the master terminal; and
   receive and display the status reports of slave display terminals in the same group.

20. The system of claim 17, wherein the master terminal of a private group comprises a touch panel to display a graphical user interface (GUI) that comprises a set of navigation buttons, which is arranged to:
   show the status report of a selected slave display terminal;
   show the remote configuration of a selected slave display terminal;
   show a synchronization screen to trace the auto play back process of the selected slave display terminal;
   initiate the drop-in video call;
   navigate through a popup menu;
   provide a list of menu items including a post message, a post picture, a post video, a settings, a block call, a mute and a reconnect;
   display the two clickable icons, which appear to indicate a status of the master terminal; and
   exhibit a notifier window to display a summary view of the most recent received posts on the master terminal.

21. The system of claim 20, wherein the remote configuration is arranged to:
   set a playback speed;
   enable or disable the popup menu;
   enable or disable the incoming drop-in video call;
   enable or disable a video camera;

set a content expiration time;
specify the other slave display terminals, which are authorized to make the drop-in video call or transmit the posts to this slave display terminal which is to be configured;
enable or disable a content cache of the at least one backend server;
provide a nighttime range settings; and
apply settings to trigger changes to the selected slave display terminal.

* * * * *